(12) United States Patent
Ellringmann et al.

(10) Patent No.: US 9,475,966 B2
(45) Date of Patent: Oct. 25, 2016

(54) ADHESIVE COMPOSITION FOR ADHERING PRINTING PLATES TO IMPRESSION CYLINDERS FOR FLEXOGRAPHIC PRINTING

(71) Applicant: TESA SE, Hamburg (DE)

(72) Inventors: Kai Ellringmann, Hamburg (DE); Kristin Kerber, Hamburg (DE)

(73) Assignee: tesa SE, Norderstedt (DE)

( * ) Notice: Subject to any disclaimer, the term of this patent is extended or adjusted under 35 U.S.C. 154(b) by 31 days.

(21) Appl. No.: 14/407,110

(22) PCT Filed: Jun. 13, 2013

(86) PCT No.: PCT/EP2013/062249
§ 371 (c)(1),
(2) Date: Dec. 11, 2014

(87) PCT Pub. No.: WO2014/001096
PCT Pub. Date: Jan. 3, 2014

(65) Prior Publication Data
US 2015/0175852 A1   Jun. 25, 2015

(30) Foreign Application Priority Data

Jun. 27, 2012   (DE) .................. 10 2012 211 075

(51) Int. Cl.
*C09J 133/08* (2006.01)
*B41N 3/00* (2006.01)
(Continued)

(52) U.S. Cl.
CPC ............. *C09J 133/08* (2013.01); *B32B 37/12* (2013.01); *B32B 37/18* (2013.01); *B41N 3/00* (2013.01);
(Continued)

(58) Field of Classification Search
CPC ....................................................... B32B 37/18
USPC ........................................................ 156/332
See application file for complete search history.

(56) References Cited

U.S. PATENT DOCUMENTS 7,491,758 B2 * 2/2009 Amano ................. C09J 7/0217
428/343
8,152,944 B2   4/2012 Ellringmann et al.
(Continued)

FOREIGN PATENT DOCUMENTS

DE   103 10 722 A1   9/2004
DE   103 12 031 A1   9/2004
(Continued)

OTHER PUBLICATIONS

International Search Report dated Aug. 13, 2013, mailed Aug. 27, 2013.
(Continued)

*Primary Examiner* — Daniel Lee
(74) *Attorney, Agent, or Firm* — Norris McLaughlin & Marcus, P.A.

(57) ABSTRACT

Pressure-sensitive adhesive composition, having at least one polymer component formed of a monomer mixture of at least (a) one acrylic ester and/or methacrylic ester of the formula $CH_2=C(R_1)(COOR_2)$, where $R_1=H$ and $R_2$ is a linear alkyl radical with 2 to 10 C atoms or a branched alkyl radical with at least 4 C atoms, (b) at least one N-alkyl substituted acrylamide, (c) at least one acrylic ester and/or methacrylic ester of the formula $CH_2=C(R_3)(COOR_4)$, where $R_3=H$ or $CH_3$ and $R_4$ is a linear alky radical with at least 12 C atoms, (d) acrylic acid and/or methacrylic acid.

14 Claims, 5 Drawing Sheets

(51) Int. Cl.
*B32B 37/12* (2006.01)
*B32B 37/18* (2006.01)
*C08F 220/18* (2006.01)
*B41N 6/02* (2006.01)
*C09J 133/26* (2006.01)

(52) U.S. Cl.
CPC .............. *B41N 6/02* (2013.01); *C08F 220/18* (2013.01); *C09J 133/26* (2013.01); *B32B 2037/1246* (2013.01); *C09J 2201/606* (2013.01)

(56) References Cited

U.S. PATENT DOCUMENTS

| | | |
|---|---|---|
| 8,333,865 B2 | 12/2012 | Husemann et al. |
| 2004/0234753 A1 | 11/2004 | Husemann et al. |
| 2005/0064181 A1 | 3/2005 | Blank et al. |
| 2007/0029309 A1 | 2/2007 | Keite-Telgenbuscher et al. |
| 2008/0286485 A1 | 11/2008 | Zollner et al. |
| 2009/0277562 A1* | 11/2009 | Ellringmann .......... C09J 7/0289 156/60 |
| 2011/0166311 A1 | 7/2011 | Ellringmann et al. |

FOREIGN PATENT DOCUMENTS

| | | |
|---|---|---|
| DE | 10 2004 002 279 A1 | 8/2005 |
| DE | 10 2008 023 758 A1 | 11/2009 |
| EP | 0 760 389 A | 3/1997 |
| EP | 1 302 521 A2 | 4/2003 |
| EP | 2 116 584 A1 | 11/2009 |
| EP | 2 226 372 A1 | 9/2010 |
| WO | 03/057497 A1 | 7/2003 |
| WO | 2004/067661 A | 8/2004 |

OTHER PUBLICATIONS

English Translation of International Search Report dated Aug. 13, 2013, mailed Aug. 27, 2013.

\* cited by examiner

1

ADHESIVE COMPOSITION FOR ADHERING PRINTING PLATES TO IMPRESSION CYLINDERS FOR FLEXOGRAPHIC PRINTING

This is a 371 of PCT/EP2013/062249 filed 13 Jun. 2013, which claims foreign priority benefit under 35 U.S.C. 119 of German Patent Application 10 2012 211 075.5 filed 27 Jun. 2012, the entire contents of which are incorporated herein by reference.

The invention relates to a pressure-sensitive adhesive based on a polymer obtainable by copolymerizing (meth) acrylic acid monomers and to the use of such an adhesive for bonding flexible printing plates.

BACKGROUND OF THE INVENTION

Within the printing industry a variety of techniques are known for transferring designs to paper or films, for example, by means of print originals. One possibility is that known as flexographic printing.

In the flexographic printing process, flexible printing plates are bonded to printing cylinders or printing sleeves. Such plates consist, for example, of a polyethylene terephthalate film (PET film) on which there is an applied photopolymer layer into which the appropriate print relief can be introduced by exposure of the print elements and subsequent washing-out of the non-print elements. The plate is then bonded to the printing cylinder or printing sleeve by way of the PET film.

For the bonding, generally speaking, double-sided pressure-sensitive adhesive tapes are used, on which very stringent requirements are imposed. For the printing operation, the pressure-sensitive adhesive tape is required to have a certain hardness, but also a certain elasticity. These properties must be set very precisely in order that the printed image produced yields the desired outcome in accordance with the requirements. Stringent requirements are likewise imposed on the pressure-sensitive adhesive (PSA), since the bond strength ought likewise to be sufficient so that the printing plate does not detach from the double-sided pressure-sensitive adhesive tape, or the pressure-sensitive adhesive tape from the cylinder or sleeve. This must be so even at elevated temperatures of 40 to 60° C. and at relatively high printing speeds. In addition to this property, however, the PSA must also possess reversible adhesion properties, to allow the printing plates to be detached again after the printing operations (in that situation, the adhesive bond between the pressure-sensitive adhesive tape and the print cylinder or print sleeve, and also the bond to the plate, must be able to be parted without residue, in order to ensure that both components can be used again). This detachability ought also to exist after bonding over a relatively long period (up to 6 months). It is desirable, moreover, for it to be possible to remove the pressure-sensitive adhesive tape and especially the printing plate without destruction thereof, and also without great application of force, since in general the printing plates are used a number of times. Furthermore, there should be no residues on the printing plate and on the cylinder or sleeve. In summary, therefore, very exacting requirements are imposed on the double-sided pressure-sensitive adhesive tapes suitable for this utility.

Residue-free redetachability is a problem especially in the case of polar substrates such as steel, for example, since here it has been found that the bond strengths increase considerably over the course of time. For the purposes of the present specification, in relation to surfaces, the terms "polar" and "high-energy", i.e., having a high surface energy (SE), are equated, as are the terms "nonpolar" and "low-energy", since this simplifying model has become established in the art. The finding that lies behind this is that polar dipole forces are comparatively strong relative to what are called "disperse" or nonpolar interactions, which are built up without participation of permanent molecular dipoles. The basis for this model of interfacial energy and interfacial interactions is the idea that polar components interact only with polar components, and nonpolar components only with nonpolar components.

This energy and its components are often measured by measurement of the static contact angles of different test liquids. The surface tensions of these liquids are assigned polar and nonpolar components. From the contact angles observed between the droplets and the test surface, the polar and nonpolar components of the surface energy for the surface under test are ascertained. This can be done, for example, according to the OWKR model. One alternative method customary industrially is the determination using test inks according to DIN ISO 8296.

Examples of pressure-sensitive adhesives include those based on natural rubber, as documented by EP 760 389 A. Also employed for the stated utility, however, are pressure-sensitive adhesive tapes having polyacrylate-based PSAs. Accordingly, for example, WO 03/057497 A describes an acrylate PSA based on block copolymer for the stated application. WO 2004/067661 A discloses a pressure-sensitive adhesive tape with a PSA based on a soft acrylic monomer ($T_G<-20°$ C.) composed of at least 49.5 wt % of a hard, cyclic or linear (meth)acrylic ester monomer ($T_G \geq 30°$ C.) and at least 10 wt % of functionalized hard (meth)acrylic/ester monomers ($T_G \geq 30°$ C.), the PSA being produced in a two-stage method.

A further disadvantage of many PSAs known from the prior art for the adhesive bonding of printing plates is manifested especially when the bonded printing plates are to be cleaned to remove the printing ink. This is normally brought about by using the solvents, which also serve as solvents for the inks themselves, in large quantities for washing and removing the inks from the plates. Inevitably in this procedure, however, there is creepage below the edges of the bond of the plate on the pressure-sensitive adhesive tape, and the edges of the adhesive tape on the printing cylinder or printing sleeve. This entails detachment of the bond (of the plate to the adhesive tape and of the adhesive tape to the cylinder or sleeve), since the adhesives of the pressure-sensitive adhesive tape lose the necessary adhesion. The lifted edges produced as a result ("flags") prevent further printing operations by smearing the printing ink, if there are not, indeed, mechanical problems with the flags in the printing apparatus and hence system outages. In practice, therefore, the bonds on printing plates mounted with prior-art adhesives have to be protected from the solvent by sealing of the respective edges with single-sided pressure-sensitive adhesive tapes or with liquid adhesives or hotmelt adhesives.

This additional sealing operation implies a significant extra expense, and the risk exists of damaging the expensive printing plates on demounting, particularly where liquid adhesives or hotmelt adhesives are used.

EP 2 226 372 A1 discloses an acrylate-based PSA for the bonding of printing plates to cylinders or sleeves that has a high acrylic acid fraction of between 8 and 15 wt %. Further monomers are linear and branched acrylic esters, and are in a defined ratio to one another. Using such an adhesive, the requirements in terms of edge lifting behavior and solvent resistance are met very well. PSAs with a high acrylic acid fraction, however, lead to strong peel increase on polar substrates, such as steel, which is commonly the material for printing cylinders. This problem also arises with the adhesive of EP 2 226 372 A1, particularly if it is used on the side of the adhesive tape facing the printing cylinder or printing sleeve. Demounting such adhesives from such substrates, therefore, entails problems; very high demounting forces arise, and the adhesive tape used may fracture, or residues remain on the substrate.

In the tailoring of pressure-sensitive adhesion properties to particular end uses, the composition of the polymer component has a substantial influence. In the prior art there are a series of applications known that disclose acrylate-based PSAs where selection may be made from the pool of the parent monomers composed, among others, of hard acrylic monomers, stearyl acrylate, N-alkyl-substituted amides, such as N-tert-butylacrylamide, and acrylic acid, as for instance in DE 10 2004 002 279 A1, in DE 103 10 722 A1, in 103 12 031 A1, or else in DE 10 2008 023 758 A1. While the three former specifications disclose PSAs for other areas of application, DE 10 2008 023 758 A1 is directed to a use comparable with that of the present specification.

None of the cited documents, however, discloses a PSA based on a monomer mixture which corresponds specifically to the composition of the monomers set out above, even less so in specifically designated proportions to one another. Advantages arising for a PSA of this kind—in relation to the composition of DE 10 2008 023 758 A1 as well—especially in relation to the bonding of printing plates to polar substrates, therefore, cannot be inferred from any of the stated specifications, not even in combination with one another.

It is an object of the present invention to specify a PSA which even under the influence of solvents, ensures effective and reliable bonding to material common in flexographic printing, such as to PET (polyethylene terephthalate) in particular, but which nevertheless is still redetachable even after a very long time and even from highly polar substrates—such as the surfaces of print cylinders made from steel or the surfaces of polar plastics of defined printing sleeves. The PSA ought preferably to be suitable in particular for the reliable bonding of printing plates; for an adhesive tape with the PSA, the stability of the adhesive tape assembly, particularly the reliable anchoring of the PSA on foam carriers—such as polyolefinic foams—is to be ensured.

SUMMARY OF THE INVENTION

Having been found particularly advantageous for achieving the stated object is a pressure-sensitive adhesive which comprises at least one polymer component based on a monomer mixture, the monomer mixture comprising at least the following monomers:

i.a) 50-89.5 wt % of at least one acrylic ester and/or methacrylic ester having the following formula:

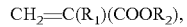

it being the case in particular that the homopolymer of the respective acrylic ester and/or methacrylic ester possesses a glass transition temperature $T_G$ (based on DIN 53 765) of at most −20° C.;

i.b) 5-20 wt % of at least one N-alkyl-substituted acrylamide, i.c) 5 to 25 wt % of at least one acrylic ester and/or methacrylic ester having the following formula:

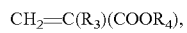

where $R_3$=H or $CH_3$ and $R_4$ is a linear alkyl radical having at least 12 C atoms, i.d) 0.5-5 wt % of acrylic acid and/or methacrylic acid, the amounts figures being based in each case on the monomer mixture.

Monomers of group i.a) selected are, in particular, esters of acrylic acid with linear alcohols having 2 to 10 C atoms and/or esters of acrylic acid with branched alcohols having at least 4 C atoms, and/or esters of methacrylic acid with linear alcohols having 8 to 10 C atoms and/or esters of methacrylic acid with branched alcohols having at least 10 C atoms.

DETAILED DESCRIPTION

Figure 1:
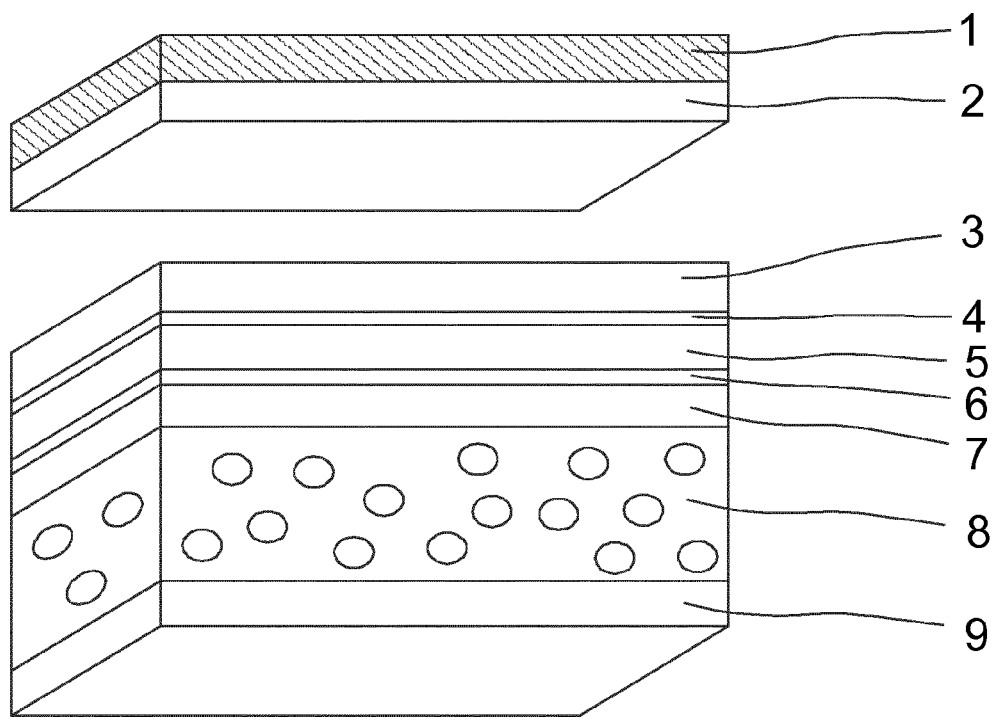
FIG. 1 illustrates the construction of a printing plate composed of a PET film 2 and a layer of photopolymer 1; and the construction of the adhesive plate-mounting tape with layers 3 to 9.

Glass transition temperatures are cited as the result of measurements by differential scanning calorimetry DSC according to DIN 53 765, particularly sections 7.1 and 8.1, but with uniform heating and cooling rates of 10 K/min in all heating and cooling steps (cf. DIN 53 765, section 7.1, note 1). The initial sample mass is 20 mg. The PSA is pretreated (cf. section 7.1, first run). Temperature limits: −140° C. (instead of $T_G$−50° C.)/+200° C. (instead of $T_G$+50° C.). The reported glass transition temperature $T_G$ is the sample temperature in the heating operation of the second run at which half of the change in specific heat capacity has been reached.

The glass transition temperatures, as a characteristic feature of the monomers used, are specified in relation to the respective homopolymer of each of the monomers, obtainable according to the synthesis protocol for acrylate PSAs in the experimental section, using 400 g of the respective monomers rather than the monomer mixture. The $T_G$ is determined after removal of the solvent, in the noncrosslinked state (in the absence of crosslinkers).

The term "pressure-sensitive adhesive" (PSA) refers, as is customary, to those viscoelastic, polymeric compositions which—optionally as a result of appropriate additization with further components, such as tackifier resins, for example—are durably tacky and permanently adhesive at the application temperature (room temperature, i.e., 23° C., unless otherwise defined) and adhere to a multiplicity of surfaces on contact, with adhesion more particularly being instantaneous (which exhibit what is called "tack" [also referred to as stickiness or touch-stickiness]). They are capable, even at the application temperature and without activation by solvent or by heat—but optionally under the influence of a more or less high pressure—of wetting a bond substrate sufficiently to allow interactions sufficient for adhesion to develop between the composition and the substrate.

PSAs consist customarily of a polymer component, also called base polymer component, which may be a homopolymer, a copolymer, or a mixture of polymers (homopolymers and/or copolymers), and optionally adjuvants (co-components, additives), sometimes to a considerable extent. The expression "polymer component based on a monomer mixture" here means, as is generally customary, that the polymer may be obtained by polymerization—more particularly, radical polymerization—of the corresponding monomer mixture, in particular by a method as described in the experimental section.

PSAs can be produced in principle on the basis of polymers of different chemical types. The pressure-sensitive adhesion properties are influenced by factors including the nature and the proportions of the monomers employed—that is, the composition of the monomer mixture—in the polymerization of the polymers on which the PSA is based, the average molar mass and the molar mass distribution of the polymers, and optional admixing of adjuvants (type and amount).

In order for the viscoelastic properties to be obtained, the monomers which provide a basis for the PSA's parent polymers, and also any further components of the PSA that are present, are selected in particular such that the PSA has a glass transition temperature $T_G$ below the application temperature (usually, in other words, below room temperature) [regarding the figure for the glass transition temperature, see above]. Beneath the glass transition temperature $T_G$, PSAs exhibit brittle-elastic (glasslike-amorphous or semicrystalline) behavior; here it is not possible for pressure-sensitive adhesion behavior to develop. Above the glass transition temperature $T_G$, the materials soften to a greater or lesser extent with increasing temperature, according to their composition, and, within a particular temperature range, adopt the viscosity values that are suitable for the pressure-sensitive adhesion properties, before, at even higher temperatures, becoming too highly mobile still to possess pressure-sensitive adhesion properties (unless they undergo decomposition beforehand).

Another criterion for suitability as a PSA is that of cohesion. The polymer material must typically have sufficient cohesion to allow the adhesion to be mediated on adhesive bonding, and not to flow from the bondline. By means of suitable cohesion-enhancing measures, such as crosslinking reactions (formation of bridge-forming links between the macromolecules), for example, it is possible to adjust, enlarge and/or shift the temperature range within which a polymer material has pressure-sensitive adhesion properties. The area for application of the PSAs can therefore be optimized by making an adjustment between fluidity and cohesion of the material.

Polymer Component

The polymer component of the PSA of the invention comprises one or more polymers of which at least one, preferably all, polymer(s) are based on a monomer mixture comprising at least the above-defined monomers i.a) to i.d) (i.e., are obtainable by polymerization from one such monomer mixture).

Very preferably, the polymer or polymers forming the polymer component are polymers which can be traced back essentially exclusively to acrylic monomers. Acrylic monomers—also identified as (meth)acrylic monomers—are those monomers, for the purposes of this specification, that are derivatives of acrylic acid or of methacrylic acid, including the stated acids themselves.

Very preferably, the PSA of the invention is an adhesive in which the polymer component is based to an extent of more than 99 wt %, more particularly 100 wt %, on (meth)acrylic monomers, more particularly exclusively on (meth)acrylic monomers as per the definitions of i.a) to i.d). The monomer listing given above for the polymers of the PSA of the invention may therefore be—substantially—conclusive, meaning that the monomer mixture for polymerization of the polymer component comprises not more than 1 wt % of, and more particularly no, further comonomers, and more particularly that the monomer mixture, apart from the stated monomers i.a) to i.d), contains neither other acrylic monomers nor other monomers at all (and hence consists of the monomers i.a) to i.d)). If the polymer component comprises more than one polymer, then more than 99 wt %, and preferably all (100 wt %), of at least one of the polymers, very preferably of all the polymers, can be traced back to a monomer mixture composed of the monomers i.a) to i.d).

In another embodiment of the PSA of the invention, however, it is also possible for the polymer component to be based on a monomer mixture which in addition to the monomers i.a) to i.d) comprises up to 10 wt %, based on the monomer mixture, of ii.) copolymerizable further monomers.

Such copolymerizable further monomers within the meaning of group ii.) may be, for example, wholly or partly monomers having at least one singly or multiply unsaturated carbon-carbon bond and/or wholly or partly monomers having at least one singly or multiply unsaturated carbon-heteroatom bond. These comonomers ii.) may be acrylic monomers (meaning that the polymer component remains a straight acrylic system; for example, acrylic monomers whose glass transition temperature is greater than 20° C.; especially if they are selected (nature and relative amount with respect to component i.a)) such that the glass transition temperature of the resulting polymer does not exceed 20° C.) and/or nonacrylic monomers.

In accordance with the invention the monomer mixture for preparing the polymer component of the PSA of the invention comprises acrylic acid and/or methacrylic acid in a fraction of 0.5 to 5 wt %. Moreover, at least one N-alkyl-substituted acrylamide is included in the monomer mixture in a fraction of 5 to 20 wt %. The monomers of the monomer mixture, particularly (meth)acrylic monomers of the definitions as per i.a) and/or i.c), and/or monomers of group ii.) that are optionally present, may comprise hydroxyl groups, although it is possible in accordance with the invention, to outstanding effect, to do without the presence of hydroxyl groups in the monomer mixture—and, correspondingly, in the resulting polymer component—without any adverse effect on the properties of the PSA of the invention.

A feature of the PSA of the invention is that apart from the aforementioned functionalities—carboxyl groups, N-alkyl-substituted acrylamides, optionally hydroxyl groups, though advantageously with omission of the latter—and (meth) acrylic esters, which are preferably not in hetero-substituted form, there need not be any further functional groups—such as, for example, sulfonic acid groups, lactam groups, lactone groups, N-hetero-substituted amide groups, N-substituted amine groups, carbamate groups, epoxy groups, thiol groups, alkoxy groups, ether groups, cyano groups, and halide substituents, to name but a few—on the monomers, and so such functional groups also do not occur in the resulting polymers. A PSA of the invention is advantageous, then, if its macromolecules are free from functional groups which are not stated in the definition of the monomers according to groups i.a) to i.d).

Especially advantageously, the polymers of the polymer component of the PSA of the invention have a number-average molar mass $M_{n,P}$ of between 10 000 g/mol and 600 000 g/mol, preferably between 30 000 g/mol and 400 000 g/mol, very preferably between 50 000 g/mol and 300 000 g/mol. Its weight-average molar mass $M_{w,P}$ ought preferably to be in a range between 500 000 and 3 000 000 g/mol, more preferably between 800 000 g/mol and 2 200 000 g/mol. In particular the polydispersities $M_w/M_n$ are between 5 and 40.

Figures for molar masses (number-average and weight-average) and polydispersities in the context of this specification relate to the determination by gel permeation chromatography. The determination is made on 100 µl of sample which has been given a clarify filtration (sample concentration 4 g/l). Tetrahydrofuran with 0.1 vol % trifluoroacetic acid is employed as eluent. Measurement takes place at 25° C. The preliminary column used is a PSS-SDV column, 5µ, $10^3$ Å, ID 8.0 mm×50 mm. Separation takes place using PSS-SDV columns, 5µ, $10^3$ Å and also $10^6$ Å and $10^6$ Å, each with ID 8.0 mm×300 mm (columns from Polymer Standards Service; detection using Shodex RI71 differential refractometer). The flow rate is 1.0 ml per minute. Calibration takes place relative to PMMA standards (polymethyl methacrylate calibration).

Monomers

Group i.a) monomers selected are preferably monomers whose homopolymer has a glass transition temperature $T_G$ of at most −20° C. These are, in particular, esters of acrylic acid with linear alcohols having 2 to 10 C atoms or with branched alcohols having at least 4 C atoms, and esters of methacrylic acid with linear alcohols having 8 to 10 C atoms or with branched alcohols having at least 10 C atoms. Specific examples according to the invention are preferably one or more members selected from the group encompassing n-propyl acrylate, n-butyl acrylate, n-pentyl acrylate, n-hexyl acrylate, n-heptyl acrylate, n-octyl acrylate, n-octyl methacrylate, n-nonyl acrylate, n-nonyl methacrylate, n-decyl acrylate, n-decyl methacrylate, isobutyl acrylate, isopentyl acrylate, isooctyl acrylate, isooctyl methacrylate, the branched isomers of the aforementioned compounds, such as, for example, 2-ethylhexyl acrylate, 2-ethylhexyl methacrylate, 2-propylheptyl acrylate.

Used as N-alkyl-substituted acrylamide for monomer group i.b) are preferably N-n-butylacrylamide, N-sec-butylacrylamide, N-octylacrylamide, N-isopropylacrylamide, N,N-diisopropylacrylamide, N,N-dibutylacrylamide, N,N-dimethylacrylamide and/or N,N-diethylacrylamide, very preferably N-tert-butylacrylamide.

The N-alkyl-substituted acrylamides used in accordance with the invention preferably have no further hetero-substituents, particularly not on the nitrogen atom.

The monomers of group i.c) are monomers which in the polymer result in an increased tendency to form semicrystalline regions. This behavior is found for acrylic esters and methacrylic esters with a linear alkyl radical having at least 12 C atoms in the alcohol residue, preferably of at least 14 C atoms in the alcohol residue. As monomer group i.c) it is possible with particular advantage in accordance with the invention to use, for example, stearyl acrylate and/or stearyl methacrylate.

Where comonomers are present in the sense of group ii.), they are wholly or partly selected, for example, from the group encompassing vinyl compounds such as vinyl esters, vinyl ethers, vinyl halides, vinylidene halides, vinyl compounds with aromatic rings and heterocycles, especially in α-position to the double bond. However, other compounds copolymerizable with acrylic monomers can also be used here.

Crosslinking

In order to obtain the optimum properties of the PSA of the invention, it ought very preferably to be crosslinked.

One technique characterizing the state of crosslinking of a PSA is to determine its shear behavior. For this purpose, for example, the shear strength of layers of the PSA in question is determined by ascertaining the maximum micro-shear travel under a temperature load of 40° C.

Figures for the micro-shear travel, as a characteristic of the state of crosslinking of the PSA, are made below in relation to the shearing in 15 min at 40° C. of a sheet section initially measuring 13 mm×10 mm with a thickness corresponding to a basis weight of 50 g/m² under a load of 1.0 N in the direction of the greater longitudinal extent, conforming to the method as described in the "Micro-shear travel measurement/state of crosslinking" section of this specification.

The PSA of the invention is especially suitable for use for the bonding of printing plates to printing cylinders and printing sleeves, particularly as a layer of adhesive and of an adhesive tape on the side facing the printing cylinder or sleeve (i.e., in contact with these substrates on bonding) when its micro-shear travel, in relation to the reference indicated above, is between 100 µm and 300 µm. The best properties for the adhesive of the invention are obtained for a state of crosslinking corresponding to a micro-shear travel, in relation to the reference indicated above, of between 125 µm and 250 µm.

The aforementioned values can be effectively set by using a suitable crosslinker in a well-defined amount, more particularly in the case of a crosslinking reaction which has almost completely run its course.

Through addition of suitable thermal crosslinkers, the PSA of the invention advantageously has thermal crosslinkability, and therefore does not require the addition of actinically activatable crosslinkers, such as crosslinkers activatable by ultraviolet light (UV crosslinkers), for example. Thermal crosslinking may be carried out under conditions which are substantially milder for the PSA, since it does not require exposure to the radiation, which also has a destructive effect.

If desired in a particular case, however, it is also possible to bring about crosslinking exclusively or additionally by exposure to actinic radiation, in which case any crosslinker substances useful or required may be added (e.g. UV crosslinkers).

Generally speaking, therefore, the PSA of the invention comprises thermal crosslinkers, these being substances which permit (initiate) and/or promote a crosslinking reaction under the influence of thermal energy.

Adjusting the state of crosslinking—particularly to the preferred ranges specified above—may be done, for example, by the use of covalently reacting crosslinkers, more particularly epoxides, isocyanates and/or aziridines, and/or through the use of coordinative crosslinkers, more particularly metal chelates, preferably aluminum chelate.

Metal chelates, such as aluminum chelates in particular, in the form of aluminum(III) acetylacetonate, for example, are used for achieving the above-specified state of crosslinking preferably in an amount of 0.15 to 0.35 part by weight, more preferably of 0.2 to 0.3 part by weight, based in each case on 100 parts by weight of the polymer component (solvent-free).

Examples of other very suitable thermal crosslinkers are epoxides containing tertiary amine functions, such as, in particular, tetraglycidyl-meta-xylenediamine (N,N,N',N'-tetrakis(oxiranylmethyl)-1,3-benzenedimethanamine). These compounds are used preferably in an amount of 0.03 to 0.1 part by weight, more preferably of 0.04 to 0.07 part by weight, as for example 0.06 part by weight, in turn based in each case on 100 parts by weight of the polymer component (solvent-free), in order to achieve the state of crosslinking defined above.

Crosslinking advantageously takes place such that the crosslinking reaction has as far as possible run its entire course. For this purpose it is useful if at least 85 wt %, preferably at least 90 wt %, of the crosslinker is converted during the crosslinking reaction. At such a conversion of the crosslinking reaction, it has been possible in each case to realize the above-defined state of crosslinking of the PSA.

A further subject of the invention is a method for producing a crosslinked PSA, where first of all a polymer component is prepared by radical polymerization from a monomer mixture comprising the monomers i.a) to i.d), during or, preferably, after the polymerization at least one thermal crosslinker is added, more particularly one or more of the crosslinkers set out above, very preferably aluminum (III) acetylacetonate or tetraglycidyl-meta-xylenediamine, more particularly in the respective amounts specified above, the polymer component is admixed optionally with further polymer components based on a monomer mixture comprising the monomers i.a) to i.d) and/or, optionally, further additives, and the PSA mixed with the crosslinker is crosslinked, by supply of thermal energy, to an extent such that its state of crosslinking corresponds to a micro-shear travel in the range from 100 µm to 300 µm in the range from 125 µm to 250 µm (for reference see above).

Admixtures

In a preferred way, the polymer component as such—without substantial fractions of other constituents—is already pressure-sensitively adhesive. In an advantageous configuration of the invention, the polymer component or polymer components based on monomer mixtures comprising the monomers i.a) to i.d) make up at least 90 wt %, preferably at least 98 wt %, more preferably at least 98 wt %, more preferably more than 99.9 wt % of the PSA. A figure of 100 wt % is very preferred. As a concomitant of their production, however, PSAs typically comprise a small fraction of impurities, unconverted monomers or the like.

Given a suitable choice of the monomers, as defined with the monomers i.a) to i.d) and, optionally, the comonomers ii), the PSA of the invention may be used resin-free and/or—disregarding the presence or absence of crosslinkers (see above)—free from other additives.

In order to fine-tune the pressure-sensitive adhesion properties, or as contributory components to a crosslinking or curing reaction, resins are frequently admixed to PSAs (tackifier resins, reactive resins). Conversely, the PSA of the invention may be realized outstandingly without the admixing of resins, without this having any deleterious effect on its suitability for the stated purpose. In this context, tackifying resins, thermoplastic resins, and reactive resins may be omitted. In particular, the absence of resins leads to a particularly residue-free substrate surface after demounting of the adhesive tape, as for example to particularly residue-free printing cylinders or printing sleeves, after the pressure-sensitive adhesive tape of the invention, previously bonded, has been removed again.

Resins are considered for the purposes of this specification to comprise, in particular, those oligomeric and (lower) polymeric compounds whose number-average molecular weight $M_n$ is not more than 5 000 g/mol. Of course, short-chain polymerization products which come about during the polymerization of the above-defined monomer mixture for preparing the polymer component of the PSA of the invention are not subsumed by the term "resins".

Tackifying resins—also referred to as tackifier resins—frequently have softening points in the range from 80 to 150° C., without any wish that this span should be imposed on the definition. The figures for the softening point $T_s$ of oligomeric and polymeric compounds, such as of the resins, relate to the ring & ball method of DIN EN 1427:2007 with appropriate application of the provisions (analysis of the oligomer sample or polymer sample instead of bitumen, with the procedure otherwise retained). The measurements are made in a glycerol bath. Those resins which can be omitted for the PSA of the invention are, for example, natural and/or synthetic resins, such as pinene resins and indene resins, rosin and derivatives of rosin (rosin esters, including rosin derivatives stabilized by disproportion or hydrogenation, for example), polyterpene resins, terpene-phenolic resins, alkyl phenolic resins, aliphatic, aromatic, and aliphatic-aromatic hydrocarbon resins, to name but a few.

Reactive resins are those resins which have functional groups such that they would be able, given appropriate activation, to react with further constituents of the PSA—such as the macromolecules of the polymer components or other reactive resins, for example.

In order to optimize the PSA of the invention, moreover, the additives familiar in each case to the skilled person for the particular purpose may be added. An advantage of the PSA of the invention, however, is that even in additive-free form—leaving aside the crosslinkers which are discussed separately—it is outstandingly suitable for the intended application given. It is therefore possible to omit further additives—leaving aside the presence or absence of crosslinkers—without this having disadvantageous consequences for the advantageous properties of the PSA. Hence it is possible in particular to omit the admixing of additives such as plasticizers, filling materials, functional adjuvants for obtaining particular physical properties (such as electrically conductive filling materials, thermally conductive filling materials, and the like), flame retardants (such as ammonium polyphosphate and its derivatives, for example), and the like.

Use

The PSA of the invention is suitable for reliable bonding on common materials and is notable for good residue-free redetachability. It exhibits this behavior in particular even for very polar substrates, from which prior-art adhesives, especially after a prolonged period of bonding, can generally not be parted again without leaving residues.

Very good reversibility, i.e., residue-free redetachability, has been found even for substrates whose surface energy is 45 mN/m or more, in particular even for materials having surface energies in the region of 48 mN/m or more, such as steel, for example, which according to literature figures has the value of 50 mN/m.

The invention further provides the use of the PSA of the invention as a layer of adhesive for pressure-sensitive adhesive tapes, more particularly for double-sided pressure-sensitive adhesive tapes, and also the corresponding pressure-sensitive adhesive tapes comprising a layer of the PSA of the invention. Such adhesive tapes may be equipped in particular with a carrier, optionally further layers and two outer layers of adhesive, which in turn may be provided temporarily—for more convenient handling, storage, and presentation—on one or both PSA layers with a temporary lining material, or liner. With such adhesive tapes equipped with pressure-sensitive adhesion on both sides, both layers of adhesive may be formed from the PSA of the invention—and may be identical in particular in their composition and/or thickness and/or state of crosslinking—or else one of the layers of adhesive may be realized by a PSA of the invention, while the other layer of adhesive is selected from a different PSA, which may be geared optimally to the substrate to be bonded accordingly. Suitable carrier materials for the pressure-sensitive adhesive tapes are the films customary and familiar to the skilled person, such as, for example, polyesters, polyethylene terephthalate (PET), polyethylene (PE), polypropylene (PP), biaxially oriented polypropylene (BOPP), monoaxially oriented polypropylene (MOPP), polyurethane (PU), polyvinyl chloride (PVC) and so on, it also being possible for these materials to be used in each case as a foamed layer.

Attention is drawn to the fact that the PSA of the invention may also be used as a layer of adhesive on other adhesive tapes, examples being single-layer, carrier-less adhesive tapes ("adhesive transfer tapes"), which consist of the layer of adhesive.

The PSA of the invention may be used outstandingly for bonding flexible printing plates to curved surfaces, particularly to printing cylinders or printing sleeves, more particularly as a layer of adhesive in a pressure-sensitive adhesive tape. The particular suitability of the PSA of the invention for reversible bonding to steel (see above) makes it particularly suitable for bonding to printing cylinders and/or sleeves made from that material. Since, however, the adhesive also possesses the outstanding properties on other materials, the pressure-sensitive adhesive tapes in question may be used very flexibly, including in their utility in flexographic printing. In that case the PSA of the invention is employed with particular preference as a layer of adhesive on double-sided pressure-sensitive adhesive tapes, with the PSA of the invention representing the layer of adhesive facing the printing cylinder or printing sleeve during bonding. Use is made in particular of double-sided pressure-sensitive adhesive tapes of the kind described above. Carrier material used in this case is advantageously a foamed sheetlike structure—for example, a polymer foam layer. Hence it is possible in particular to use foamed polyolefins—such as polyethylene and polypropylene; particular preference is given to a polyethylene/ethylene-vinyl acetate foam. Moreover, for example, foamed polyurethanes or foamed polyvinyl chlorides may be employed. Generally speaking, the carrier material may be roughened to improve the anchoring of the PSA. One way of roughening and of chemically modifying the polymer structure involves wet-chemical etching of the carrier material. Besides etching, there are other possible pretreatments. Thus, for the purpose of improving the anchoring, the carrier materials may be pretreated physically and chemically. For the physical treatment, the film is treated preferably by flame or corona or plasma. For the chemical pretreatment, the carrier material is given an undercoat, and in one particularly preferred version, reactive undercoats are used. Suitable undercoat materials include, for example, reactive primers.

The construction of an adhesive tape of the invention of this kind corresponds in one very preferred embodiment to a layer sequence as reproduced in FIG. 1. In that case the PSA of the invention is used with particular preference as layer 9 of adhesive, in other words the layer of adhesive facing the printing cylinder or printing sleeve in application, since the adhesive is optimized for this end use.

By virtue of the broad utility spectrum of the PSA of the invention, it is also suitable for the adhesive layer which is in contact with the printing plate.

The adhesive tape of the invention serves advantageously to bond a printing plate which is composed of a PET film 2 and a layer of a photopolymer 1.

Layers 3 to 9 form a double-sidedly adhesive plate-mounting tape of the invention, which by virtue of its foamed carrier 8 is compressible and elastic.

Beginning from the side by means of which the plate is bonded, the adhesive tape consists of the following individual sections:

3 PSA for anchoring the plate
4 The roughened top surface of the PET film 5
5 Film of polyethylene terephthalate (PET)
6 The roughened bottom surface of the PET film 5
7 PSA for anchoring the foamed carrier 8 to the PET film 5
8 Foamed carrier
9 PSA for anchoring on the printing cylinder In the printing industry especially it is important that the adhesive tapes employed here have a high flexibility, i.e., are able to alter their thickness to a certain extent when pressure is applied, and to regain their original form when the load has been removed.

For this reason, in another advantageous embodiment of the double-sidedly adhesive tape, there is a foamed carrier present between the polyethylene terephthalate (PET) film and at least one adhesive, more particularly between the polyethylene terephthalate (PET) film and the adhesive facing the printing cylinder or sleeve, where the adhesive tape finds use in the printing industry.

It is advantageous, furthermore, if the foamed carrier 8 consists of polyolefin(s), polyvinyl chloride or polyurethane. One particularly preferred embodiment uses foamed polyethylenes and/or polypropylenes. It is further preferred if the surfaces of the foamed carrier 8 have been physically pretreated, the physical pretreatment method being selected in particular from the group consisting of corona pretreatment, flame pretreatment, or plasma treatment.

The physical pretreatment technique commonly referred to as "corona pretreatment" is usually a "dielectric barrier discharge" (DBD) wherein high-voltage discharges are generated by means of high-frequency alternating voltage. The substrate for treatment is passed in the form of a web between two high-voltage electrodes, with at least one electrode consisting of or having been coated with a dielectric material. The material for treatment is exposed directly to the electrical discharges, or at least to the reactive gas generated by the discharges. The electrical discharges are often referred to as "corona discharges".

Corona pretreatment as a method for the surface pretreatment of carriers is much in use industrially. Serving as a process gas, typically, is the ambient air. The use of process gases other than air, such as nitrogen, carbon dioxide, or noble gases, for example, is likewise prior art.

Alternatively, the surface of the PSA layer 9 that faces the carrier may be physically pretreated, more particularly by corona pretreatment, flame pretreatment or plasma treatment, in order to improve the strength of the bond between the PSA layer and the carrier. Physical treatment of the PSA may likewise be carried out advantageously in air as process gas, although process gases used may also be, for example, nitrogen, carbon dioxide, or noble gases. Having been found advantageous are, for example, nitrogen or a mixture of air and nitrogen.

For increasing the bond strength between the PSA layer 9 and foamed carrier 8 it has emerged, surprisingly, as being particularly advantageous if not only the PSA layer 9 but also the foamed carrier 8 are pretreated physically on their sides respectively facing one another when assembled, prior to being brought together, more particularly by one of the aforementioned physical methods. In this case the pretreatment methods for the two layers may be selected independently of one another, but preferably they are pretreated by the same method, more preferably by means of corona pretreatment. By pretreatment of both layers, especially by corona pretreatment, the internal strength of the bond is significantly improved, and any residues of the adhesive tape—already a small quantity when using the PSA of the invention—remaining on demounting from its substrate (such as a printing cylinder or printing sleeve, for instance) may be perceptibly reduced even further.

In principle, then, it is surprising to the skilled person that through the treatment of a surface of adhesive by a physical method it is possible to achieve an increase in the bond strength. The skilled person in fact expects all of these methods to be accompanied by chain breaks and a degradation of material, and so the expectation would be that a layer would be formed having a high level of polar groups, but a low internal cohesion. As a result of the weakly cohesive layer with increased polarity, improved wetting of the substrate by the adhesive is not surprising, but reduced adhesion properties will be expected.

The intensity of corona pretreatment is reported as the "dose" in [W*min/m$^2$], with the dose D=P/(b*v), where P=electrical power [W], b=electrode width [m], and v=belt speed [m/min].

Corona pretreatment takes place preferably at a dose of 1 to 150 W*min/m$^2$. Particularly preferred for the layer of PSA is a dose of 10 to 100 W*min/m$^2$, more particularly a dose of 40 to 60 W*min/m$^2$. For the foam carrier layer, higher doses are preferably used—for instance, here, a dose of 50 to 150 W*min/m$^2$, and more particularly a dose of 80 to 120 W*min/m$^2$, are very advantageous in this context.

The film of polyethylene terephthalate (PET) preferably has a thickness of 5 μm to 500 μm, more preferably 5 μm to 60 μm; especially preferred are 12 μm and 23 μm.

Besides the product construction shown in FIG. 1, the stabilizing film may also consist of polyolefins, polyurethanes, or polyvinyl chloride, and in addition to the etching it may also have been pretreated in a variety of ways. For instance, the stabilizing films may be pretreated physically and chemically in order to improve anchoring. For the physical treatment, the film is treated preferably by flame or corona or plasma. For the chemical pretreatment, the film is given an undercoat, with reactive undercoats being used in one particularly preferred embodiment. Examples of suitable undercoat materials include reactive primers. Furthermore, alternatively or additionally to the film layer, the adjacent layers of adhesive may also have been pretreated, corresponding in particular to the above-described layer 9 of adhesive.

In a further preferred version, the stabilizing film of polyethylene terephthalate or another material is printed on one or both sides. This printing may lie beneath a PSA for subsequent application.

For the PSAs 7 it is likewise possible, for example, to use an acrylate PSA, although in principle other types of adhesive can also be used.

Furthermore, the adhesive tape of the invention may be provided on one or both sides with a lining of paper or of a corresponding film, more particularly a double-sidedly siliconized film, in order to ensure longer storage and convenient handling during service.

The other adhesive tape designs as known from the prior art, particularly for the bonding of printing plates to printing cylinders or sleeves, may also be realized in accordance with the invention, with at least the layer of adhesive for bonding to the cylinder or sleeve, in particular, being realized through the PSA of the invention.

On account of its special properties, the double-sidedly adhesive tape of the invention may be used outstandingly for the fastening of printing plates, especially of photopolymer printing plates, and especially their multilayer forms, to printing cylinders and to printing sleeves.

By virtue of its special design, particularly with the bond strengths geared to the printing plate, the adhesive tape of the invention is outstandingly suitable for bonding the printing plates to the printing cylinders. On the one hand it is possible to reposition the printing plates before printing begins; on the other, however, firm bonding of the plate is ensured during the printing process. The printing plate can be removed from the pressure-sensitive adhesive tape without any damage at all. Peeling of the carrier layer of the plate, or the formation of unwanted creases in the plate during removal, do not occur. After the removal of the adhesive tape from the printing cylinder, no residues are left, either.

Figure 2:
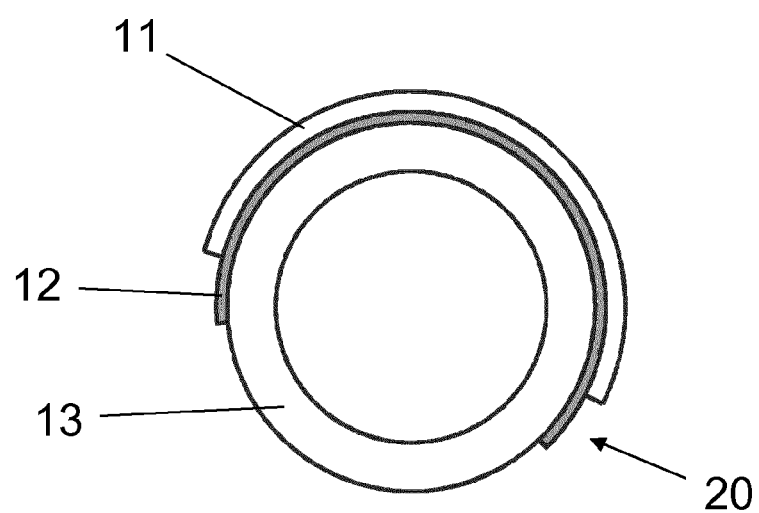
FIG. 2 illustrates plate (11) bonded to printing sieve (13) or printing cylinder (13) by means of adhesive tape (12)
Figure 3:
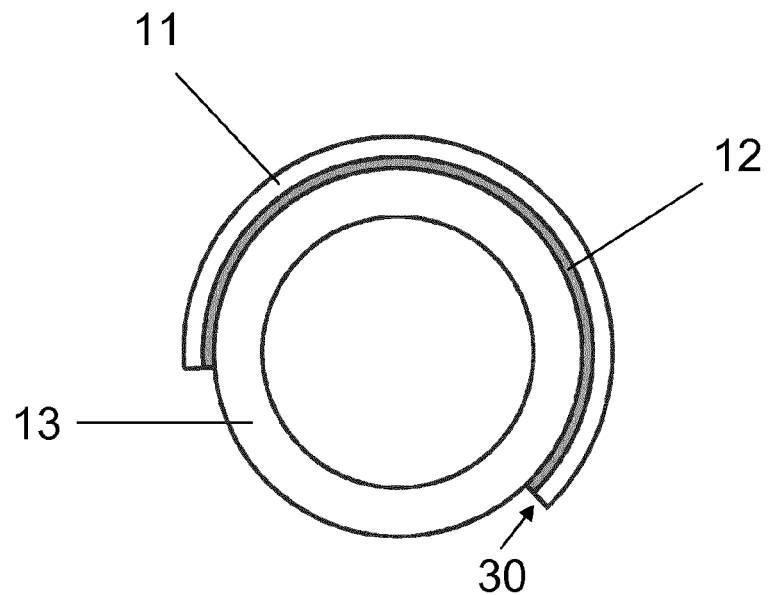
FIG. 3 illustrates a variant of the assembly in which the adhesive tape (12) and plate (11) finish flush with one another, as shown by edge (30)

Printing plates are bonded to printing cylinders and printing sleeves in a variety of ways. Common methods are shown by FIGS. 2, 3, and 4a:

According to FIG. 2, the plate (11) is bonded to the printing sleeve (13) or printing cylinder (13) by means of an adhesive tape (12) which is larger than the plate (11) and therefore projects by exposed regions (20) beneath the plate (11). According to the application variant in FIG. 3, the edges of the assembly of adhesive tape (12) and plate (11) finish flush with one another, edge (30).

Figure 4A:
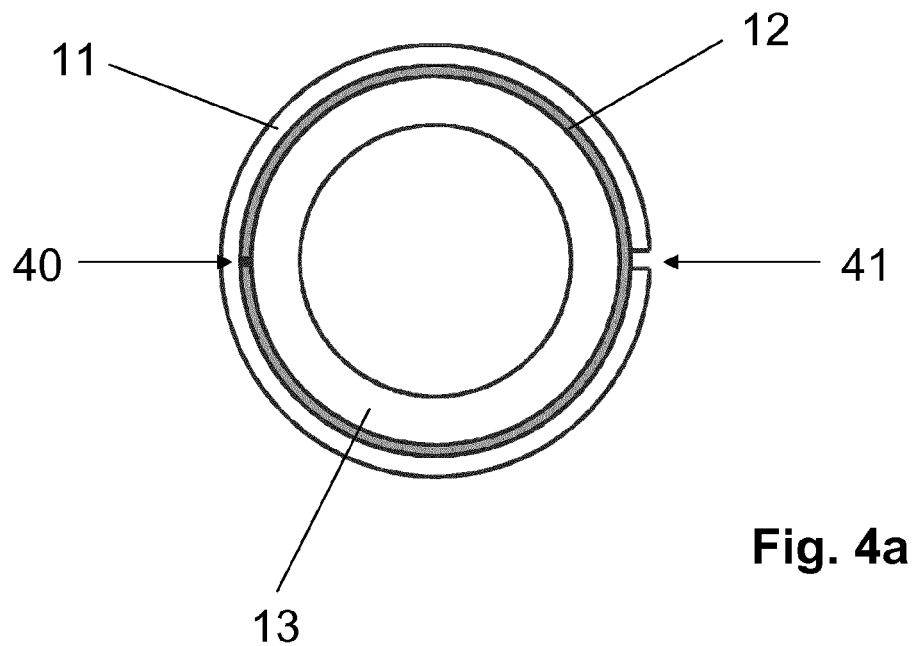
FIG. 4a illustrates a variant in which the adhesive tape (12) for bonding the plate (11) surrounds the entire periphery of printing cylinder (13) or printing sleeve (13)

According to FIG. 4a, the adhesive tape (12) for bonding the plate (11) surrounds the entire periphery of the printing cylinder (13) or printing sleeve (13), with the edges of the adhesive tape abutting it, position (40). In order to prevent lifting of the assembly, the printing plate (11) is a fixed on the adhesive tape in such a way that its edges (position 41) do not lie at the location of the adhesive tape butt joint (position 40).

These forms of application are shown here merely by way of example, without any intention they should thereby restrict the teaching according to the invention.

Figure 4B:
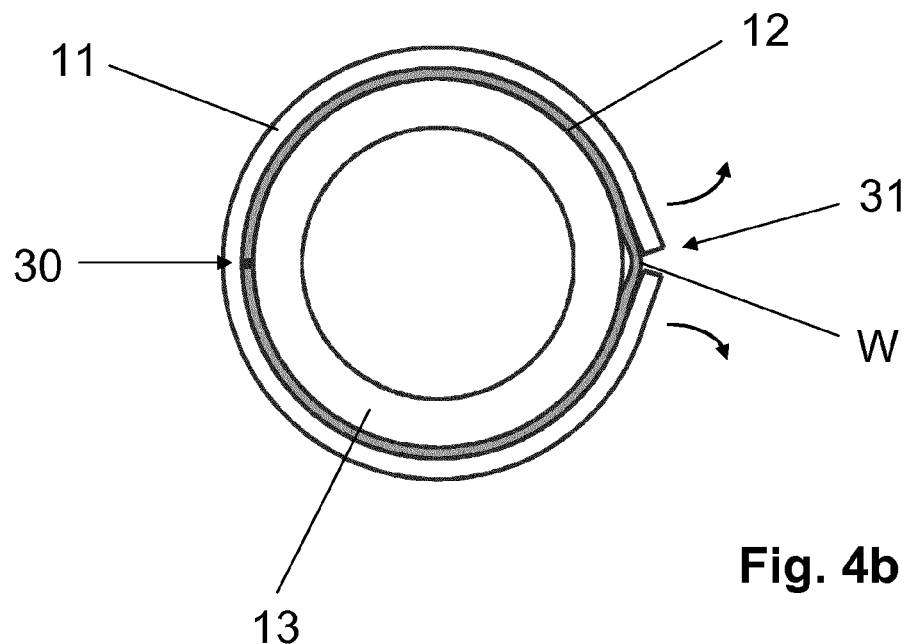
FIG. 4b illustrates an instance where the edges of the resilient plate lift up the adhesive at point W, and produce a corregation.

Because the printing plate has a certain stiffness, it tends to resile to the planar area and therefore to lift from the circular substrate at the plate edges. If the fixing of the pressure-sensitive adhesive tape to the substrate, in other words to the printing cylinder or printing sleeve, for instance, is not sufficient, the edges of the resilient plate lift up the adhesive tape at this point, and a corrugation is produced (shown by way of example in FIG. 4b, corrugation W). A corrugation of this kind may propagate beneath each lifting plate edge at the point of lifting, which moves along the periphery of the substrate, with the consequence that, in an extreme case, the adhesive tape parts almost completely from the printing cylinder or printing sleeve. Even with only slightly resilient plate edges, with non-moving detachment points, however, the bonding at this point is greatly weakened by the corrugation.

The adhesive tape of the invention has proven very advantageous in preventing such corrugation.

The adhesive tapes of the invention exhibit very good mounting characteristics. Mounting characteristics in the sense of the present specification are understood in particular as the instantaneous adhesion during the bonding of an adhesive tape to a substrate, by means of the pressure-sensitive adhesive layer in question. For good mounting characteristics, therefore, brief applied pressure at low force ought, accordingly, to lead to effective and reliable adhering.

The PSAs of the invention meet the requirements for simple mounting, repositionability, secure hold even, in particular, on polar substrates and under the influence of solvent. Moreover, they are notable for simple and residue-free demountability, without forming corrugations or bubbles. They are suitable in particular for application in flexographic printing, as set out above.

Experiments

The PSAs investigated (inventive examples and reference examples) were prepared as follows, unless otherwise indicated:

Acrylate PSAs

A 2 L glass reactor conventional for radical polymerizations was charged with 400 g of the monomer mixture corresponding to the composition as shown for the individual examples in tables 1 and 2, 150 g of acetone, and 150 g of special boiling point (SBP) spirit 60/95, with thorough mixing. After nitrogen gas had been passed through the reactor for 45 minutes, with stirring, the reactor was heated to 58° C. (internal temperature) by means of an external heating bath, and 0.16 g of 2,2'-azodi(2-methylbutyronitrile) (Vazo 67) in solution in 10 g of acetone was added. Thereafter the external heating bath was heated to 75° C. and the reaction was carried out constantly with evaporative cooling (external temperature 75° C.). After a reaction time of 1 hour, a further 0.24 g of 2,2'-azodi(2-methylbutyronitrile) in solution in 10 g of acetone was added. After a total reaction time of 3 hours, the batch was diluted with 45 g of acetone and 45 g of SBP spirit 60/95. After a total reaction time of 5 hours and 30 minutes, 0.60 g of bis(4-tert-butylcyclohexanyl)peroxydicarbonate in solution in 10 g of acetone was added. After a total reaction time of 7 hours, a further 0.60 g of bis(4-tert-butylcyclohexanyl)peroxydicarbonate in solution in 10 g of acetone was added. After a total reaction time of 10 hours, the batch was diluted with 45 g of acetone and 45 g of SBP spirit 60/95. After a total reaction time of 24 hours, the reaction was discontinued and the batch was cooled to room temperature.

TABLE 1

Comparative experiments (not inventive); prior-art adhesive tapes

| | corresponds to | Polymer composition (wt %) ** | | | | | | Amount of crosslinker * |
|---|---|---|---|---|---|---|---|---|
| | | NTBAM | Stearyl acrylate | Acrylic acid | Resin * | Crosslinker | |
| C1 | | 76 EHA | 0 | 20 | 4 | 10 PTH | Al chelate | 0.33 |
| C2 | | 76 EHA | 0 | 20 | 4 | 30 KE | Al chelate | 0.33 |
| C3 | DE 10 2009 011 482 A, Example 9 | 29 BA, 59 EHA | 0 | 0 | 12 | — | Al chelate | 0.25 |
| C4 | DE 10 2008 023 758 A, Example B2 | 10 MA, 43.5 BA, 43.5 EHA | 0 | 0 | 3 | 11.1 TPH | Al chelate | 0.20 |
| C5 | DE 10 2008 023 758 A, Example B6 | 62 EHA, 25 BA | 10 | 0 | 3 | 17.6 TPH | Al chelate | 0.20 |
| C6 | DE 10 2008 023 758 A, Example B7 | 10 MA, 38.5 BA, 38.5 EHA | 0 | 10 | 3 | 25 TPH | Al chelate | 0.20 |
| C7 | WO 2004/067661 A, Example B3 | 78 EHA | 0 | 20 | 2 | — | Al chelate | 0.60 |
| C8 | DE 10 2009 011 482, Comparative example R1 | Synthetic rubber (styrene/butadiene/styrene triblock copolymer) | | | | Alpha-pinene resin, liquid hydrocarbon resin | | |

NTBAM = N-tert-butylacrylamide

EHA = 2-ethylhexyl acrylate;

BA = n-butyl acrylate;

MA = methyl acrylate

PTH = polyterpene resin based on beta-pinene (Dercolyte S125; from DRT; softening point (ring/ball) about 125° C.);

KE = glycerol ester of partially hydrogenated rosin (Foralyn 90; from Eastman; softening point (ring/ball) about 90° C.);

TPH = terpene-phenolic resin

Al chelate = aluminum(III) acetylacetonate

* Parts by weight per 100 parts by weight of polymer

** (note the sometimes different reference in the individual references)

TABLE 2

PSAs for implementing the measurement series, inventive examples and comparative examples

| | | Polymer composition (wt %) ** | | | | | |
|---|---|---|---|---|---|---|---|
| | | n-Butyl acrylate | NTBAM | Stearyl acrylate | Acrylic acid | Crosslinker | Amount of crosslinker * |
| E1 | Inventive | 67 | 10 | 15 | 3 | Epoxide | 0.06 |
| C9 | Comparative exp. | 52 | 25 | 15 | 3 | Epoxide | 0.06 |
| E2 | Inventive | 57 | 20 | 15 | 3 | Epoxide | 0.06 |
| E3 | Inventive | 62 | 15 | 15 | 3 | Epoxide | 0.06 |
| E4 | Inventive | 72 | 5 | 15 | 3 | Epoxide | 0.06 |
| C10 | Comparative exp. | 77 | 0 | 15 | 3 | Epoxide | 0.06 |
| C11 | Comparative exp. | 87 | 10 | 0 | 3 | Epoxide | 0.06 |
| E5 | Inventive | 82 | 10 | 5 | 3 | Epoxide | 0.06 |
| E6 | Inventive | 77 | 10 | 10 | 3 | Epoxide | 0.06 |
| E7 | Inventive | 67 | 10 | 20 | 3 | Epoxide | 0.06 |
| E8 | Inventive | 62 | 10 | 25 | 3 | Epoxide | 0.06 |
| C12 | Comparative exp. | 57 | 10 | 30 | 3 | Epoxide | 0.06 |
| C13 | Comparative exp. | 67 | 10 | 15 | 3 | Epoxide | 0.02 |
| E9 | Inventive | 67 | 10 | 15 | 3 | Epoxide | 0.03 |
| E10 | Inventive | 67 | 10 | 15 | 3 | Epoxide | 0.05 |
| E11 | Inventive | 67 | 10 | 15 | 3 | Epoxide | 0.07 |
| E12 | Inventive | 67 | 10 | 15 | 3 | Epoxide | 0.09 |
| C14 | Comparative exp. | 67 | 10 | 15 | 3 | Epoxide | 0.10 |
| C15 | Comparative exp. | 67 | 10 | 15 | 3 | Al chelate | 0.10 |
| E13 | Inventive | 67 | 10 | 15 | 3 | Al chelate | 0.15 |
| E14 | Inventive | 67 | 10 | 15 | 3 | Al chelate | 0.20 |
| E15 | Inventive | 67 | 10 | 15 | 3 | Al chelate | 0.30 |
| E16 | Inventive | 67 | 10 | 15 | 3 | Al chelate | 0.35 |
| C16 | Comparative exp. | 67 | 10 | 15 | 3 | Al chelate | 0.40 |

NTBAM = N-tert-butylacrylamide
Al chelate = aluminum(III) acetylacetonate
Epoxide = tetraglycidyl-meta-xylenediamine
* Parts by weight per 100 parts by weight of polymer Polymer solution A obtained as described above was diluted to a polymer fraction of 30%, using a 1:1 mixture of acetone and SBP spirit 60/95, and the amount indicated in tables 1 and 2 of the crosslinker defined therein for the respective example (the crosslinker used in each case as a 3% strength solution in acetone) was added, and also, if required according to the table, blending was carried out with resins present (comparative examples C1, C2, C4, C5, C6), to give polymer solution B. The examples for the inventive PSAs contained no resin admixtures.

For the micro-shear travel measurement and the T-peel measurements, the resulting polymer solution B was coated onto a polyethylene terephthalate film 23 μm thick which had been etched using trichloroacetic acid. After drying for 15 minutes at 120° C. and conditioning for seven days at 23° C. and 50±5% relative humidity, the coatweight was 50 g/m² (adhesive tape a).

For the remaining investigations, the polymer solution B was coated onto a siliconized polyethylene terephthalate film. After drying for 15 minutes at 120° C. and conditioning for seven days at 23° C. and 50±5% relative humidity, the coatweight was 50 g/m² (adhesive tape b).

Comparative Example 8

Synthetic Rubber PSA 20 parts by weight of a styrene/butadiene/styrene triblock copolymer of type Kraton® D 1118 (about 76 wt % diblock, block polystyrene content: 31 wt %, Kraton Polymers), 40 parts by weight of a styrene/butadiene/styrene triblock copolymer of type Kraton® D 1101 (about 18 wt % diblock, block polystyrene content: 31 wt %, Kraton Polymers), 30 parts by weight of alpha-pinene resin (Dercolyte® A 115, softening temperature: about 115° C., from DRT), and 10 parts by weight of a liquid hydrocarbon resin (Wingtack® 10, from Goodyear) were dissolved in a 50:50 mixture of toluene and benzine, to give a solids content of 40%. Added aging inhibitors were 0.5 part of a sterically hindered phenol (Irganox® 1010; from Ciba Additive) and 0.5 part of a commercial UV absorber (Tinuvin® P, Ciba Additive).

Further processing was as for polymer solution B.
Production of a Bonded Assembly V A double-sided adhesive tape c comprising a polyethylene terephthalate (PET) film 23 μm thick, a synthetic rubber PSA layer 50 μm thick (as per comparative example 8) on one side of the PET film, and a laminating adhesive layer 20 μm thick on the other side of the PET film, its layer of synthetic rubber PSA being lined with a liner material, was applied by the layer of laminating adhesive to a double-sidedly corona-treated (dose 100 Wmin/m²; process gas air, belt speed 30 m/min, distance of electrodes from foam surface under treatment 2.0 mm) foam carrier (PE-EVA foam with a thickness of 500 μm and a density of 270 kg/m³).

Adhesive tape b was likewise corona-treated on its free adhesive side (dose 50 Wmin/m²; process gas air, belt speed 30 m/min, distance of electrodes from PSA surface under treatment 1.3 mm). Immediately after the corona pretreatment of foam carrier and PSA, the PSA of adhesive tape b was laminated onto the exposed side of the foam carrier, and the siliconized carrier was removed from the other side of the PSA of the invention.

The multilayer adhesive tape produced in this way is referred to as bonded assembly V.
Assessments of Application Suitability The evaluation yardsticks of the following test methods were in each case selected such that an "o" represents an outcome considered satisfactory for use in flexographic printing, whereas "−" values (and especially "−−" values) lead, in experience, to considerable problems in operation that are no longer tolerable.

"+" and "++" values characterize specimens of adhesive tapes which in operation produce hardly any problems or as good as no problems in relation to the property being tested for.

Assessment of Mounting Characteristics (Test 1)

Bonded assembly specimens measuring 230 mm×140 mm were cut from the double-sided bonded assembly V under investigation. These bonded assembly specimens were adhered using the exposed PSA of the invention, for a first investigation, onto a printing sleeve (Rotec bluelight sleeve; polyurethane surface 75 Shore D), and for a second investigation onto a commercial steel cylinder, in each case with a diameter of 110 mm, in such a way that the shorter edges of the bonded assembly specimens were aligned in the longitudinal direction of the sleeve or cylinder, respectively, and the longer edges run following the periphery. The liner material on the layer of synthetic rubber PSA was then removed. A printing plate from DuPont Cyrel HOS, exposed over its full area, with dimensions of 230 mm length×140 mm width×2.54 mm thickness, was then bonded to the exposed synthetic rubber layer of the bonded assembly specimen, in such a way that each of the edges lay congruently on the underlying bonded assembly.

The printing plate was applied by applying one of the shorter edges of the plate (transverse edge) flush with one of the shorter edges of the bonded assembly (cf. FIG. 3). Starting from this edge, the plate was then rolled on using a steel rolling weight (width greater than that of the plate, weight 7 kg). The rolling movement took place in the longitudinal direction of the printing cylinder or printing sleeve, and perpendicularly, and was performed continuously from one longitudinal edge of the plate to the opposite longitudinal edge of the plate and back again. The entire operation was repeated twice. The rolling speed here in the transverse direction was 10 m/min.

Thereafter the plate was pulled again by hand from the bonded assembly, and observation was carried out to ascertain whether the bonded assembly remained adhering reliably to the substrate (cylinder, sleeve).

The test was carried out at a temperature of 23° C. and a relative humidity of 50±5%.

Evaluation Scheme:

| Characterization | Evaluation |
| --- | --- |
| Bonded assembly adheres very well to substrate on mounting; when the plate is repositioned, the assembly does not lift from the printing cylinder or sleeve | + |
| Bonded assembly adheres very well to substrate on mounting; when the plate is repositioned, the assembly does lift from the printing cylinder or sleeve | o |
| Bonded assembly adheres poorly or not at all to the substrate on mounting | − |

The assessment allows conclusions as to whether the bonded assembly adheres reliably to the respective substrate by simple pressing on mounting. Also ascertained is whether the bonded assembly remains adhering reliably, without forming bubbles and/or without forming corrugations, on the respective substrate when the printing plate is removed again from the bonded assembly. Both requirements are regularly called for by the customers in the printing industry, who on the one hand expect secure fixing of the plate on sleeve or cylinder but on the other hand are often still required to adjust the plate for in-register fixing; the adhesive tape used for the bonding is not to be damaged and must not undergo detachment.

Assessment of Assembly Lifting (Test 2)

Bonded assembly and printing plate were mounted as for the assessment of mounting characteristics—see details above—with the corresponding applied force necessary in order to mount the plate over its full area and without edge lifting. The printing cylinder or printing sleeve was aligned so that both short edges of the bonded plate were located at a height above the axis of rotation of the cylinder or sleeve (open-lying area oriented upward). The specimens were then stored under conditions of 23° C. and 50±5% relative humidity for 3 days (72 hours).

Figure 5:
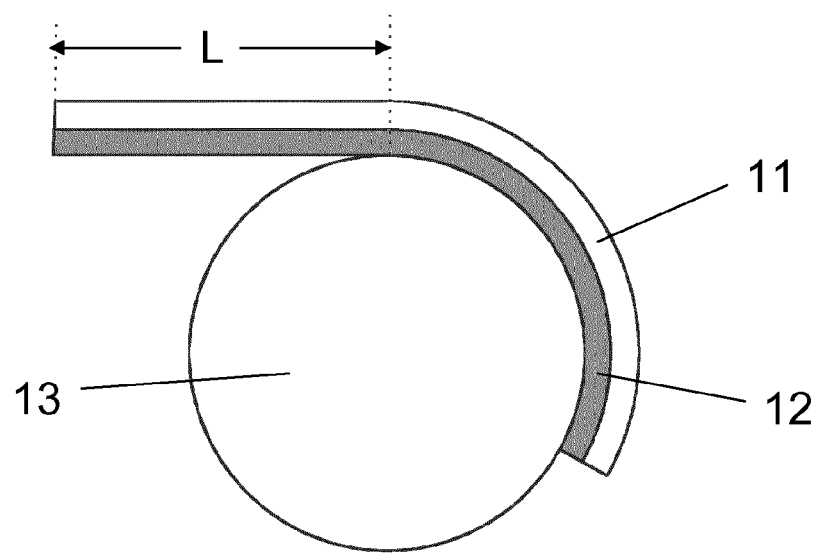
FIG. 5 illustrates a lifting of the printing plate (11) along with the bonding assembly (12) from the sleeve or cylinder (13)

Because of the resilience of the printing plate, it has a tendency—the plate or else an assembly comprising this plate—toward edge lifting. The synthetic rubber PSA on the sides of the plate (composition as per comparative example 8, see above) is selected such that edge lifting of the plate from the bonded assembly does not occur. Depending on the stability of the bond between the PSA of the invention and the respective substrate (polyurethane, steel), the underlying bonded assembly is lifted along with it (cf. FIG. 5; shown here, for simplification, only for one edge; 11=printing plate; 12=bonded assembly; 13=sleeve or cylinder). For the assessment of this behavior, a measurement is made of the length L of the lifted bonded assembly up to the first point of remaining contact with the substrate (average value in each case from the evaluation of both edges and three measurement runs).

Assessment Scheme

| | |
| --- | --- |
| L ≤ 10 mm | ++ |
| 10 mm < L ≤ 20 mm | + |
| 20 mm < L ≤ 30 mm | o |
| 30 mm < L ≤ 40 mm | − |
| L > 40 mm | −− |

The assessment method above allows statements to be made as to whether the bonded assembly assessed remains adhering durably—in other words also during prolonged storage—to the substrate in question, or whether it undergoes significant detachment from that substrate. Since a frequent occurrence within the printing industry is that printing plates are bonded to sleeves or cylinders and these sleeves or cylinders thus prepared are to be used, after the first printing operation, for subsequent, further printing operations, a frequent requirement is that the adhesive tapes used shall ensure reliable bonding of the plates even over prolonged periods of time—when the printing sleeves or cylinders thus prepared are being held in storage.

Experience has taught that adhesive tapes offered by the applicant for the bonding of flexible printing plates lead to customer complaints in relation to assembly lifting under real-life conditions hardly at all if these tapes, in the above test, achieve a rating of at least o according to the scale above, whereas negative evaluations (−, −−) on this scale regularly lead to complaints about the products. For products achieving good evaluations (+, ++), no significant complaints have been obtained to date on account of assembly lifting under real-life conditions.

Assessment of Corrugation on Demounting of the Plate (Test 3)

Figure 6:
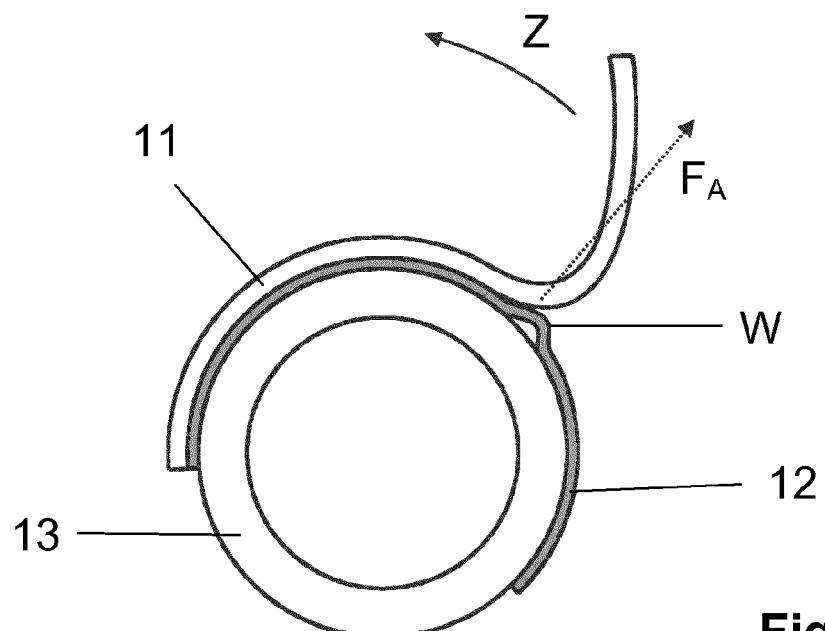
FIG. 6 illustrates a test for assessing corrugation on demounting of the plate.

The test specimens were mounted as for the assessment of the mounting characteristics—see information above—with the corresponding applied force necessary to mount the plate over the full area and without edge lifting. After storage for three days at 23° C. and 50±5% relative humidity, the plate was removed from the bonded assembly by hand at a rate of about 300 mm/min and an angle of about 90° (in this regard, cf. FIG. 6).

Here, observations were made as to whether, during removal of the plate (11), a corrugation (W) developed at the point of removal in the bonded assembly (12) remaining on the printing sleeve or printing cylinder (13). Any such corrugation, if formed, regularly propagated through the bonded assembly on further removal, with the location of removal.

The more effective the adhesion of the PSA of the invention to the substrate, the lower the tendency to develop corrugation. To assess the extent of such corrugations, a measurement was made of their height in mm (the figure reported is the average from six adhesive tape specimens produced identically).

Assessment Scheme (Corrugation Height h)

| | |
|---|---|
| No corrugation | ++ |
| h ≤ 0.5 mm | + |
| 0.5 mm < h ≤ 1.0 mm | o |
| 1.0 mm < h ≤ 1.5 mm | − |
| h > 1.5 mm | −− |

Assessment of Demounting Characteristics of the Bonded Assembly (Tests 4 and 5)

Adhesive tapes used for the fixing of printing plates are required to remain securely bonding on demounting of the plate (see above), but nevertheless to be removable without residue subsequently, even without substantial application of force.

Subsequent to the assessment of corrugation, therefore, an evaluation was made of the demounting characteristics of the bonded assembly, by removing it by hand from the printing cylinder or printing sleeve, with identically produced test specimens in each case, in a first experimental series (three experiments) sharply (Test 4) and in a second experimental series (again three experiments) at an angle of about 90° and a speed of about 300 mm/min (Test 5).

The parameter assessed in each case was the subjective force that needed to be applied. The evaluation scheme below was set up such that an application of force characterized by "o" was considered by those in the art to be acceptable for the application. Negative evaluations ("−") were considered to be no longer acceptable for every day use.

Evaluation Scheme

| | |
|---|---|
| Low force application | + |
| Moderate force application | o |
| High force application | − |

Assessment of the Residues on Cylinder or Sleeve (Test 6)

After the demounting of the bonded assembly from cylinder or sleeve, an assessment was made as to whether there remained any residues of the bonded assembly (especially of the layer of the PSA of the invention).

Evaluation scheme (reported in each case is the area f of the residues on the respective substrate as a fraction (in percent) of the originally bonded adhesive tape area)

| | |
|---|---|
| f ≤ 1% | ++ |
| 1% < f ≤ 2% | + |
| 2% < f ≤ 3% | o |
| 3% < f ≤ 4% | − |
| f > 4% | −− |

Assessment of Solvent Resistance (Test 7)

A bonded assembly V2 was produced in line with the description for producing bonded assembly V, but instead of the synthetic rubber composition described for bonded assembly V, on the sides of the plate bond, an acrylate PSA (as per comparative experiment 3) was used (thickness of this layer of acrylate PSA: 50 μm). Again, from the double-sided bonded assembly V2 under investigation, bonded assembly specimens measuring 230 mm×140 mm were cut.

The test specimens were mounted as for the assessment of the mounting characteristics—see details above—with the corresponding applied force necessary in order to mount the plate over its full area and without edge lifting. Immediately after mounting, the printing cylinder or sleeve was aligned so that both short edges of the bonded plate were situated at a height above the axis of rotation of the cylinder or sleeve (open-lying region aligned upward).

A spray bottle was used to apply a solvent mixture (1/8 ethyl acetate/1/8 n-propanol/6/8 ethanol) for 1 minute to one of the edges, so that this edge was continually under the influence of solvent. The amount of solvent applied was just enough to wet the edge in question permanently with solvent (test conditions: 23° C., 50±5% relative humidity, total applied solvent quantity in one minute: 3.5 ml).

After the end of the wetting period, the cylinder or sleeve was placed upright, allowing excess solvent to run off.

Observation was carried out to determine whether the wetted edge of the laminate formed from plate and bonded assembly had lifted from the substrate in question (cylinder or sleeve). A measure of edge lifting here was the length L, measured 60 minutes after the end of the wetting period in the tangential direction, of the section of bonded assembly no longer bonded (that is, the length of the lifted section), measured from the free end up to the first point still bonded (cf. likewise FIG. 5: 11=printing plate, 12=bonded assembly, 13=printing cylinder, L=length of the lifted section of the bonded assembly).

Evaluation Scheme:

| Edge lifting after solvent influence | Evaluation |
|---|---|
| L ≤ 50 mm | ++ |
| 50 mm < L ≤ 80 mm | + |
| 80 mm < L ≤ 110 mm | o |
| 110 mm < L ≤ 140 mm | − |
| L > 140 mm | −− |

Experience has taught that adhesive tapes offered by the applicant for the bonding of flexible printing plates lead to customer complaints in relation to edge lifting under real-life conditions hardly at all if these tapes, in the above test (that is, under drastic solvent influence), achieve a rating of at least o according to the scale above, whereas negative evaluations (−, −−) on this scale regularly lead to complaints about the products. For products achieving good evaluations (+, ++), no significant complaints have been obtained to date on account of edge lifting due to the influence of solvent under real-life conditions.

Micro-Shear Travel Measurement/State of Crosslinking (Test 8)

Figure 7:
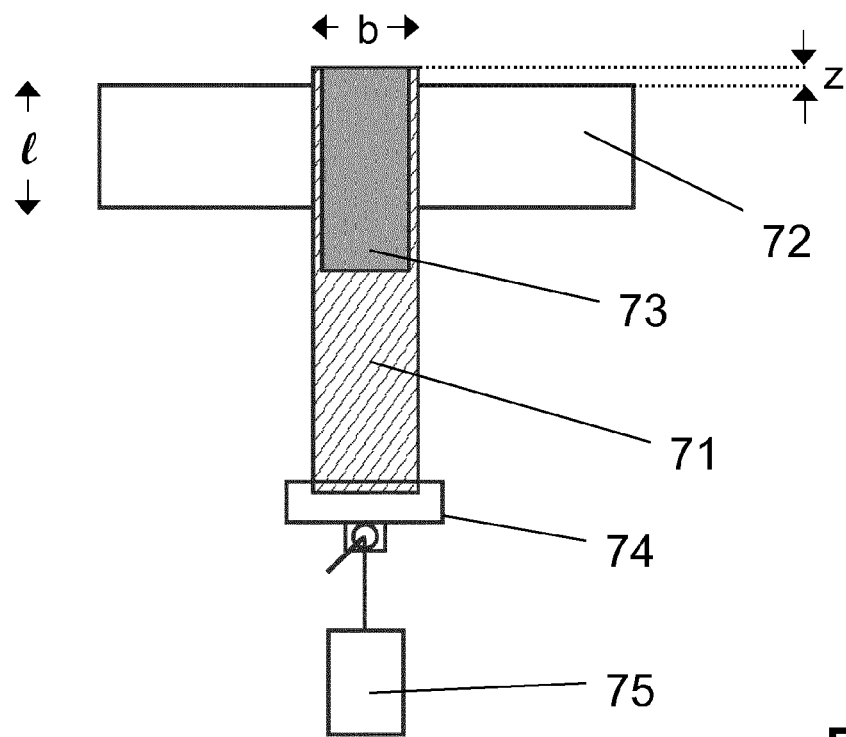
FIG. 7 illustrates a setup for measurement of micro-shear travel.

The measurement setup is illustrated in FIG. 7.

Sections measuring 10 mm×50 mm in area were cut from adhesive tape a, and the resulting adhesive tape specimen (71) was bonded to a polished, heatable steel test plate (72), 13 mm wide and cleaned with acetone, such that the longitudinal direction of the adhesive tape specimen was aligned in the transverse direction of the steel plate, the bond area had dimensions of l×w=13 mm×10 mm, and the adhesive tape protruded beyond the steel plate on one side by a section with a length z of 2 mm. For fixing, the adhesive tape was subsequently rolled on six times using a 2 kg steel roller at a speed of 10 m/min. On the side of the adhesive tape (71) facing away from the steel plate (72), the adhesive tape (71) was reinforced, flush with the edge protruding beyond the steel plate by the section with length z, with a stable adhesive strip (73) (dimensions 4 mm×25 mm; carrier PET film 190 μm thick), which served as a support for a travel sensor (not illustrated).

The arrangement thus prepared was suspended vertically such that the section with length z, overhanging the steel plate (72), of the adhesive tape specimen (71) was pointing upward. The steel test plate (72) with the bonded sample (71) was heated to 40° C. and the adhesive tape specimen (71) under measurement was loaded at the bottom end with a weight (75) of 100 g via a bracket (74) at time $t_0$=0.

Using the travel sensor, measurements were made of the deformation of the sample under shear over a time of 15 minutes (beginning at $t_0$) at a temperature of 40° C. and a relative humidity of 50±5%.

The result reported is the shear distance after 15 minutes (maximum value; downward distance traveled by the upper edge of the sample during measurement) in μm. The shear travel thus measured is a quantitative measure of the state of crosslinking of the sample under measurement.

Assessment of Bond Strengths in a T-Peel Test (Test 9)

Further adhesive tape specimens were produced each as follows:

Adhesive tapes a based on a monomer mixture of 67 wt % butyl acrylate, 10 wt % N-tert-butylacrylamide, 15 wt % stearyl acrylate, and 3 wt % acrylic acid, crosslinker 0.06 part by weight of tetraglycidyl-meta-xylenediamine per 100 parts by weight of polymer, were produced as indicated above.

Double-sided adhesive tapes c composed of a polyethylene terephthalate (PET) film 23 μm thick, a 50 μm layer of a synthetic rubber PSA (as per comparative example 8) on one side of the PET film, and a 20 μm layer of a laminating adhesive on the other side of the PET film, the synthetic rubber PSA layer thereof having been lined with a liner material composed of etched PET film 23 μm thick, were applied by the layer of laminating adhesive in each case to a double-sidedly corona-pretreated (dose 100 Wmin/m$^2$; process gas air, belt speed 30 m/min, distance of electrodes from foam surface under treatment 2.0 mm) foam carrier (PE-EVA foam with a thickness of 500 μm and a density of 270 kg/m$^3$), to give a multilayer system. The adhesive tapes a were in some cases not corona-pretreated on the free adhesive side, in some cases were corona-pretreated with different intensities and with different process gases (for doses and process gases, see table 8; belt speed in each case 30 m/min, distance of the electrodes from the PSA surface under treatment in each case 1.3 mm).

Thereafter the PSA of adhesive tape b was laminated by the exposed adhesive side (inventive, optionally corona-pretreated adhesive surface) to the exposed side of the foam carrier of in each case one of the multilayer systems produced above, it being ensured that a time of 5 minutes was not exceeded between the corona pretreatment of the two surfaces for lamination and the lamination procedure.

Test specimens with a length of 200 mm and a width of 20 mm were cut from the resulting products. This was followed by storage for seven days at 23° C. and 50%+/−5% relative humidity.

Figure 8:
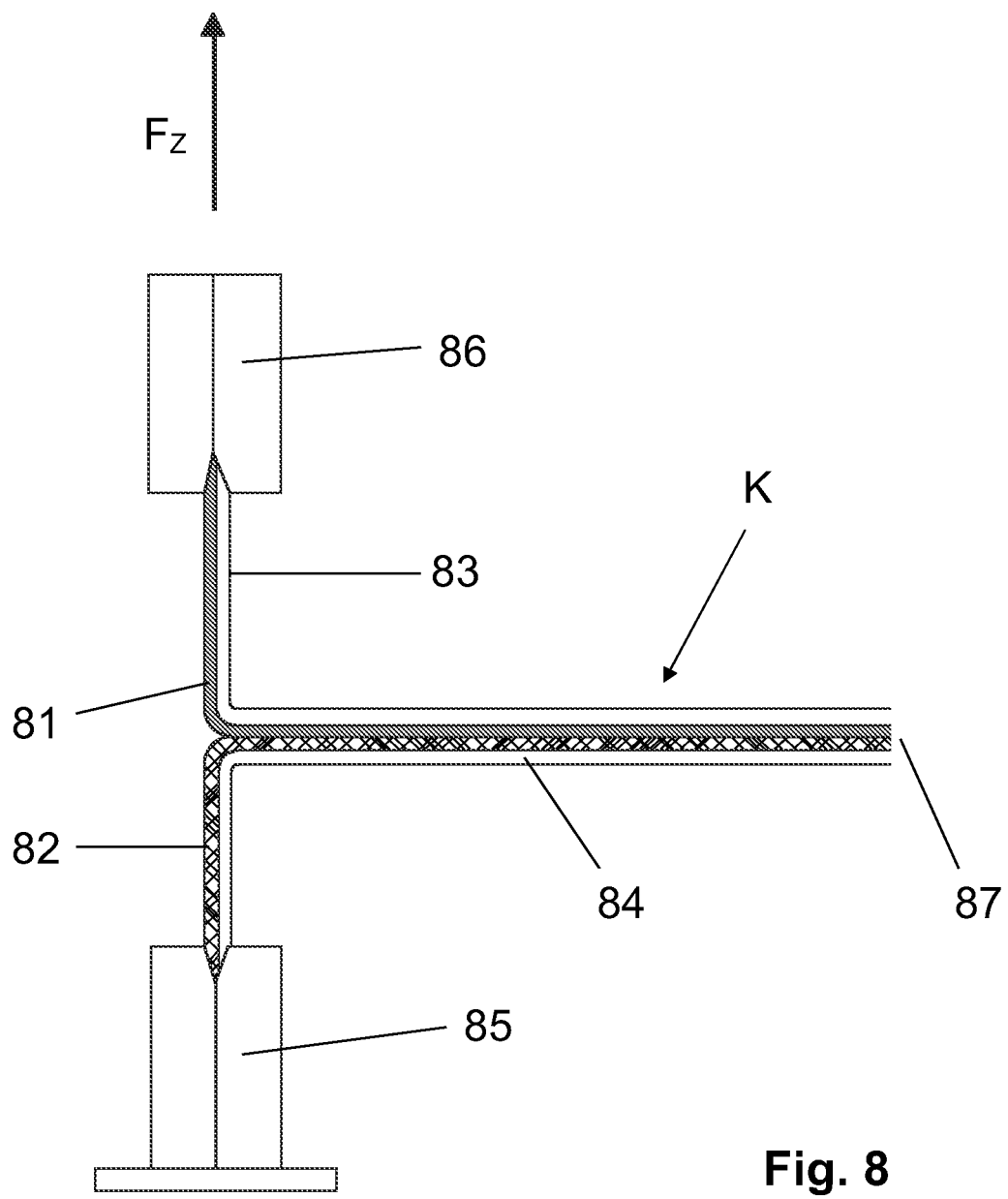
FIG. 8 illustrates a setup for measurement of bond strength.

For the measurement of the bond strengths—regarding the measurement principle, see FIG. 8—of the inventive PSA (81) on the foam carrier (82) as a function of the corona pretreatment of the adhesive, the layer (81) of PSA, together with the PET film (83) thereon, was parted a little from the foam layer (82) at one end of the test specimens (K), and the test specimen (K) was clamped into a Zwick tensile testing machine such that the geometry, viewed from the side, corresponded to a "T": the end of the test specimen from which the adhesive had been detached a little, i.e., the remaining multilayer system composed of foam (82) and layer sequence laminating adhesive/PET film/layer of adhesive/liner material (84), was clamped into a firm mounting means (85), while the detached end, composed of an inventive adhesive (81) and PET film (83), was clamped into a movable clamping means (86). The other end (87) of the test specimen (K) was held firmly so that when the clamping means (86) was pulled in the arrow direction, the assembly of inventive adhesive (81) and foam (82) was separated further, and the T-shape of the test specimen (K) was maintained. The pulling force (F) required in order to peel the inventive adhesive (81) from the foam carrier (82) corresponds to the release force.

The bond strength in T-peel was determined under test conditions of 23° C. temperature and 50%+/−5% relative humidity, for two different pulling speeds. The results of measurement are reported in N/cm and have been averaged from three measurements.

Results

Results of the Variation of the PSA Composition

In order to characterize the properties of inventive examples, series of investigations were carried out in which, independently of one another, variations were made in the fraction of N-alkyl-substituted acrylamide (here, as example, N-tert-butylacrylamide) and in the amount of acrylic esters or methacrylic ester with a linear alkyl radical having at least 12 C atoms in the alcohol residue (here, as example, stearyl acrylate). The variations encompass a PSA recognized as outstanding (example E1), which can therefore be integrated into all of the measurement series, and encompass in each case noninventive versions in the boundary ranges (outside the claimed ranges) as comparative experiments.

The results show that through the choice of the appropriate monomer composition within the claimed range, a PSA was obtained which meets the requirements for application in flexographic printing, particularly on the part of the printing sleeve and/or printing cylinder (inventive examples; no negative assessment results). If the components of the monomer composition are selected in each case within the preferred range, then only good or very good assessment results are observed (examples E1, E3, E6, E7).

Conversely, none of the adhesives from the prior art exhibited a profile which meets all of the requirements.

The inventive PSAs ensure good results both on the printing sleeve, i.e., on a polyurethane surface, and on the printing cylinder, i.e., on a steel surface.

TABLE 3

Results of the assessments of suitability for application on variation of PSA composition (Tests 1 to 7) on the printing sleeve (polyurethane surface)

|  | Example | Mounting (Test 1) | Assembly lifting (Test 2) | Corrugation (Test 3) | Demounting, sudden (Test 4) | Demounting, 300 mm/min (Test 5) | Residues (Test 6) | Solvent resistance (Test 7) |
|---|---|---|---|---|---|---|---|---|
| Comparative PSAs (prior art) | C1 | + | -- | -- | + | + | ++ | -- |
|  | C2 | + | + | -- | + | + | ++ | + |
|  | C3 | + | ++ | − | − | − | n.d. | ++ |
|  | C4 | + | + | n.d. | ○ | ○ | ○ | − |
|  | C5 | + | + | n.d. | − | − | ○ | ○ |
|  | C6 | + | + | n.d. | − | − | ○ | ○ |
|  | C7 | + | -- | -- | + | + | ++ | -- |
|  | C8 | + | ++ | ++ | + | + | ++ | -- |
|  | E1 | + | ++ | + | + | + | ++ | + |
| Variation: amount of NTBAM | C9 | ○ | + | ++ | − | − | ○ | + |
|  | E2 | ○ | + | ++ | ○ | ○ | + | + |
|  | E3 | + | ++ | ++ | + | + | + | + |
|  | E4 | + | ++ | ○ | + | + | ++ | ○ |
|  | C10 | + | ○ | − | + | + | ++ | − |
| Variation: amount of stearyl acrylate | C11 | + | ++ | ++ | − | ○ | ○ | + |
|  | E5 | + | ++ | ++ | ○ | + | + | + |
|  | E6 | + | ++ | ++ | + | + | ++ | + |
|  | E7 | + | + | + | + | + | ++ | + |
|  | E8 | ○ | + | ○ | + | + | ++ | + |
|  | C12 | − | n.d. | n.d. | n.d. | n.d. | n.d. | n.d. | n.d. = no datum/not determined

TABLE 4

Results of the assessments of suitability for application on variation of PSA composition (Tests 1 to 7) on the printing cylinder (steel surface)

|  | Example | Mounting (Test 1) | Assembly lifting (Test 2) | Corrugation (Test 3) | Demounting, sudden (Test 4) | Demounting, 300 mm/min (Test 5) | Residues (Test 6) | Solvent resistance (Test 7) |
|---|---|---|---|---|---|---|---|---|
| Comparative PSAs (prior art) | C1 | + | + | ○ | + | + | ++ | -- |
|  | C2 | + | + | -- | + | + | ++ | + |
|  | C3 | + | ++ | − | − | − | n.d. | ++ |
|  | C4 | + | + | n.d. | ○ | ○ | ○ | − |
|  | C5 | + | + | n.d. | − | − | ○ | ○ |
|  | C6 | + | + | n.d. | − | − | ○ | ○ |
|  | C7 | + | -- | -- | + | + | ++ | -- |
|  | C8 | + | ++ | ++ | + | + | ++ | -- |
|  | E1 | + | ++ | + | + | + | ++ | + |
| Variation: amount of NTBAM | C9 | + | + | ++ | − | − | − | + |
|  | E2 | + | ++ | ++ | ○ | ○ | ○ | + |
|  | E3 | + | ++ | ++ | + | + | + | + |
|  | E4 | + | ++ | ○ | + | + | ++ | ○ |
|  | C10 | + | ○ | − | + | + | ++ | − |
| Variation: amount of stearyl acrylate | C11 | + | ++ | ++ | − | ○ | ○ | + |
|  | E5 | + | ++ | ++ | ○ | + | + | + |
|  | E6 | + | ++ | ++ | + | + | ++ | + |
|  | E7 | + | + | + | + | + | ++ | + |
|  | E8 | ○ | + | ○ | + | + | ++ | + |
|  | C12 | − | n.d. | n.d. | n.d. | n.d. | n.d. | n.d. | n.d. = no datum/not determined

Results of Crosslinker Variation and of Micro-Shear Travel Measurements

From the measurement series it can be seen that the state of crosslinking of the highly suitable experimental examples corresponds to a micro-shear travel, in accordance with the measurement method defined above, but lies within the range between 100 µm and 300 µm (all inventive examples), whereas the examples with the best results exhibit a micro-shear travel in the range from 125 to 250 µm (examples E1, E10, E11, E14, E15).

TABLE 5

Results of the assessments of suitability for application on variation of crosslinker and amount of crosslinker (Tests 1 to 7) on the printing sleeve (polyurethane surface)

|  | Example | Mounting (Test 1) | Assembly lifting (Test 2) | Corrugation (Test 3) | Demounting, sudden (Test 4) | Demounting, 300 mm/min (Test 5) | Residues (Test 6) | Solvent resistance (Test 7) |
|---|---|---|---|---|---|---|---|---|
|  | E1 | + | ++ | + | + | + | ++ | + |
| Variation: amount of epoxide crosslinker | C13 | + | ○ | ○ | − | − | − | −− |
|  | E9 | + | + | + | ○ | + | + | ○ |
|  | E10 | + | ++ | ++ | + | + | ++ | + |
|  | E11 | + | ++ | ++ | + | + | ++ | + |
|  | E12 | + | + | + | + | + | ++ | ○ |
|  | C14 | + | ○ | −− | + | + | ++ | − |
| Variation: amount of Al chelate crosslinker | C15 | + | ○ | ○ | −− | −− | − | −− |
|  | E13 | + | + | + | + | + | + | ○ |
|  | E14 | + | ++ | ++ | + | + | ++ | + |
|  | E15 | + | ++ | ++ | + | + | ++ | + |
|  | E16 | + | + | + | + | + | ++ | ○ |
|  | C16 | + | ○ | −− | + | + | ++ | − |

TABLE 6

Results of the assessments of suitability for application on variation of crosslinker and amount of crosslinker (Tests 1 to 7) on the printing cylinder (steel surface)

|  | Example | Mounting (Test 1) | Assembly lifting (Test 2) | Corrugation (Test 3) | Demounting, sudden (Test 4) | Demounting, 300 mm/min (Test 5) | Residues (Test 6) | Solvent resistance (Test 7) |
|---|---|---|---|---|---|---|---|---|
|  | E1 | + | ++ | + | + | + | ++ | + |
| Variation: amount of epoxide crosslinker | C13 | + | ○ | ○ | − | − | − | −− |
|  | E9 | + | + | + | ○ | + | + | ○ |
|  | E10 | + | ++ | ++ | + | + | ++ | + |
|  | E11 | + | ++ | ++ | + | + | ++ | + |
|  | E12 | + | + | + | + | + | ++ | ○ |
|  | C14 | + | ○ | −− | + | + | ++ | − |
| Variation: amount of Al chelate crosslinker | C15 | + | ○ | ○ | −− | −− | − | −− |
|  | E13 | + | + | + | ○ | ○ | + | ○ |
|  | E14 | + | ++ | ++ | + | + | ++ | + |
|  | E15 | + | ++ | ++ | + | + | ++ | + |
|  | E16 | + | + | + | + | + | ++ | ○ |
|  | C16 | + | ○ | −− | + | + | ++ | − |

TABLE 7

Results from the micro-shear travel measurements (Test 8)

| Example | Micro-shear travel [μm] |
|---|---|
| E1 | 182 |
| C13 | 606 |
| E9 | 290 |
| E10 | 242 |
| E11 | 131 |
| E12 | 105 |
| C14 | 66 |
| C15 | 320 |
| E13 | 277 |
| E14 | 224 |
| E15 | 155 |
| E16 | 101 |
| C16 | 41 |

TABLE 8

Results from the T-peel test (Test 9), and the measurement conditions used in each case

| Dose for corona pretreatment of foam [W min/m$^2$] | Dose for corona pretreatment of adhesive [W min/m$^2$] | Process gas | Peel speed [mm/min] | Release force [N/cm] |
|---|---|---|---|---|
| 100 | —# | — | 300 | 3.2 |
| 100 | —# | — | 30 | 2.4 |
| 100 | 33 | Air | 300 | 3.0 |
| 100 | 33 | Air | 30 | 2.5 |
| 100 | 50 | Air | 300 | 7.1 |
| 100 | 50 | Air | 30 | 4.9 |
| 100 | 66 | Air | 300 | 3.3 |
| 100 | 66 | Air | 30 | 2.9 |
| 100 | 33 | Nitrogen | 300 | 3.3 |
| 100 | 33 | Nitrogen | 30 | 2.8 |
| 100 | 50 | Nitrogen | 300 | 6.7 |
| 100 | 50 | Nitrogen | 30 | 4.6 |
| 100 | 66 | Nitrogen | 300 | 3.5 |
| 100 | 66 | Nitrogen | 30 | 2.8 | no corona pretreatment of the adhesive

Results of the Experiments Relating to Corona Treatment

The measurements in the T-peel test show that by virtue of the corona pretreatment not only of the foam layer but also of the inventive layer of adhesive, it was possible to achieve significant improvement in the anchoring between these two layers (release force).

The invention claimed is:

1. A pressure-sensitive adhesive having at least one polymer component based on a monomer mixture comprising at least the following monomers:
   ia) 50 to 89.5 wt % of at least one acrylic ester and/or methacrylic ester having the following formula:

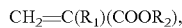

where
   $R_1$=H and $R_2$ is a linear alkyl radical having 2 to 10 C atoms or a branched, noncyclic alkyl radical having at least 4 C atoms
   and/or
   $R_1$=$CH_3$ and $R_2$ is a linear alkyl radical having 8 to 10 C atoms or a branched, noncyclic alkyl radical having at least 10 C atoms,
   ib) 5 to 20 wt % of at least one N-alkyl-substituted acrylamide,
   ic) 5 to 25 wt % of at least one acrylic ester and/or methacrylic ester having the following formula:

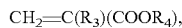

where
   $R_3$=H or $CH_3$ and $R_4$ is a linear alkyl radical having at least 12 C atoms,
   id) 0.5 to 5 wt % of acrylic acid and/or methacrylic acid, the amounts being based in each case on the monomer mixture.

2. The pressure-sensitive adhesive as claimed in claim 1, wherein said at least one N-alkyl-substituted acrylamide comprises N-butylacrylamide, N-sec-butylacrylamide, N-tert-butylacrylamide, N-isopropylacrylamide, N,N-diisopropylacrylamide, N,N-dibutylacrylamide, N,N-dimethylacrylamide and/or N,N-diethylacrylamide.

3. The pressure-sensitive adhesive of claim 1, wherein said acrylic ester and/or methacrylic ester of the formula $CH_2$=$C(R_3)(COOR_4)$ where $R_4$ is a linear alkyl radical having at least 12 C atoms comprises stearyl acrylate and/or stearyl methacrylate.

4. The pressure-sensitive adhesive of claim 1, wherein said monomer mixture comprises more than 99 wt % monomers ia) to id).

5. The pressure-sensitive adhesive of claim 1, wherein the polymer component of the pressure-sensitive adhesive is based on a monomer mixture which, in addition to the monomers ia) to id), further comprises up to 10 wt %, based on the monomer mixture, of
   ii) additional copolymerizable monomers.

6. The pressure-sensitive adhesive as claimed in claim 5, wherein said additional copolymerizable monomers ii) comprise wholly or partly those having at least one singly or multiply unsaturated carbon-carbon bond and/or wholly or partly those having at least one singly or multiply unsaturated carbon-heteroatom bond.

7. The pressure-sensitive adhesive of claim 1, wherein the polymer component or components based on monomer mixtures comprising the monomers ia) to id) make up at least 90 wt % of the pressure-sensitive adhesive.

8. The pressure-sensitive adhesive of claim 1, comprising no tackifying resins, thermoplastic resins or reactive resins.

9. The pressure-sensitive adhesive of claim 1,
   in crosslinked form, wherein the state of crosslinking corresponds to a micro-shear travel with respect of the shearing in 15 minutes of a sheet section initially measuring 13 mm×10 mm with a thickness corresponding to a basis weight of 50 g/m² under a load of 1.0 N in the direction of the greater longitudinal extent at 40° C., of between 100 μm and 300 μm.

10. A method for producing a crosslinked pressure-sensitive adhesive of claim 1, which comprises preparing a polymer component by radical polymerization from a monomer mixture comprising the monomers ia) to id), adding at least one thermal crosslinker during or after the polymerization, optionally mixing the polymer component with further polymer components based on a monomer mixture comprising the monomers ia) to id) and/or optionally further additives, and crosslinking the pressure-sensitive adhesive mixed with the crosslinker by supply of thermal energy to an extent that its state of crosslinking corresponds to a micro-shear travel with respect to the shearing in 15 minutes of a sheet section initially measuring 13 mm×10 mm with a thickness corresponding to a basis weight of 50 g/m² under a load of 1.0 N in the direction of the greater longitudinal extent at 40° C. of between 100 μm and 300 μm.

11. The method of claim 10, wherein said thermal crosslinkers comprise covalently reacting crosslinkers selected from the group consisting of epoxides, isocyanates and aziridines, and/or metal chelates.

12. The method as claimed in claim 11, wherein said crosslinker comprises N,N,N',N'-tetrakis(oxiranylmethyl)-1,3-benzenedimethanamine in an amount of 0.03 to 0.1 part by weight, based on 100 parts by weight of the polymer component (solvent-free).

13. A method for bonding flexible printing plates to curved surfaces, which comprises bonding said flexible printing plates to said curved surfaces with a pressure-sensitive adhesive of claim 1.

14. A method for bonding flexible printing plates to curved surfaces, which comprises bonding said flexible printing plates to said curved surfaces with a crosslinked pressure-sensitive adhesive produced by the method of claim 10.

* * * * *